(12) United States Patent
Nelson et al.

(10) Patent No.: US 7,720,941 B2
(45) Date of Patent: May 18, 2010

(54) METHODS, SYSTEMS AND COMPUTER PROGRAM PRODUCTS FOR NETWORK ELEMENT INFORMATION MANAGEMENT

(75) Inventors: Adam Nelson, Stone Mountain, GA (US); Christopher Boston, Atlanta, GA (US)

(73) Assignee: AT&T Intellectual Property I, L.P.

( * ) Notice: Subject to any disclaimer, the term of this patent is extended or adjusted under 35 U.S.C. 154(b) by 1229 days.

(21) Appl. No.: 10/922,776

(22) Filed: Aug. 20, 2004

(65) Prior Publication Data

US 2006/0041658 A1 Feb. 23, 2006

(51) Int. Cl.
*G06F 15/177* (2006.01)
(52) U.S. Cl. ......... 709/221; 709/220; 709/224; 709/245
(58) Field of Classification Search ......... 709/223, 709/224, 225, 220, 221, 245
See application file for complete search history.

(56) References Cited

U.S. PATENT DOCUMENTS

| | | | | |
|---|---|---|---|---|
| 5,473,596 A | * | 12/1995 | Garafola et al. | 370/241 |
| 6,128,656 A | * | 10/2000 | Matchefts et al. | 709/223 |
| 6,212,169 B1 | * | 4/2001 | Bawa et al. | 370/252 |
| 6,252,858 B1 | * | 6/2001 | Inoue | 370/254 |
| 6,260,062 B1 | * | 7/2001 | Davis et al. | 709/223 |
| 6,363,421 B2 | * | 3/2002 | Barker et al. | 709/223 |
| 6,487,590 B1 | * | 11/2002 | Foley et al. | 709/223 |
| 6,889,254 B1 | * | 5/2005 | Chandra et al. | 709/224 |
| 7,249,356 B1 | * | 7/2007 | Wilson et al. | 718/101 |
| 7,259,666 B1 | * | 8/2007 | Hermsmeyer et al. | 340/517 |
| 7,489,700 B2 | * | 2/2009 | Oogushi | 370/409 |
| 2004/0044762 A1 | * | 3/2004 | Peacock | 709/224 |
| 2004/0083308 A1 | * | 4/2004 | Sebastian et al. | 709/248 |
| 2006/0041658 A1 | * | 2/2006 | Nelson et al. | 709/224 |

\* cited by examiner

*Primary Examiner*—John Follansbee
*Assistant Examiner*—Dhairya A Patel
(74) *Attorney, Agent, or Firm*—Myers Bigel Sibley & Sajovec, P.A.

(57) ABSTRACT

A method of monitoring network elements in a communications network includes querying the network elements for reboot and/or reconfiguration event data, identifying a group of the network elements responsive to the querying, and updating information for the identified group of network elements in a network configuration database. The method may further include extracting information from the identified group of network elements into independently searchable databases. The invention may be embodied as methods, data processing systems and computer program products.

24 Claims, 30 Drawing Sheets

Welcome to the Router Config Archive

Please select the router you would like to review:

[ ⌄ ] — 405

SUBMIT

420

The following router configs were modified on the last poll
There were 490 total changes made in 33 routers.
Click on the router to view the changes.

| ber00aby | ber00ard | ber00bak | ber00shv | | |
|----------|----------|----------|----------|---|---|
| cer00owb | cer01chs | cer01shv | cpr064i00cae | | |
| cpr421i00asm | | | | | |
| | | | | | |
| | | | | | |

Please pick the date to view or the dates to compare

Dates are listed from newest to oldest

Please Select one or two dates only or click Update Now!
Selecting ONE date will display the config for that day.
Selecting TWO dates will compare the two configs.
Selecting the Current Running Config will increase loading time.

☑ Check here to see changes only — 425

Available Dates

☐ Current Running Config
☐ 05-05-2004 08:00:00
☐ 04-10-2004 08:00:00 — 430
☐ 03-26-2004 08:00:00
☐ 03-25-2004 08:00:00
☐ 02-21-2004 08:00:00 — 435

SUBMIT

Interface Hunter

502 — Interface Hunter
500

There are currently 5223 routers and 46974 interfaces in this database.

| Please enter the information you would like me to search for below. You can fill out any number of fields and I will show you if I find multiple matches! | Common DIA Queries |
|---|---|

> If you know the router please type it below.
> For example cer00asm.
> Or you can use partials!
> For example just use "asm" as the router and I will search just ASM!

[            ] — 505a

> If you know the interface please type it below.
> Please use the FULL interface name (ie Serial1/0/0.1 not S1/0/0.1)

[            ] — 505b

> If you know the company please type it below.
> You can use full names (ie Billy Bob's Arcade Zone).
> Or you can use partials (ie Bil Bo Arca).

[            ] — 505c

> If you wish to search by CPR please type it below.
> You can use full CPR names (ie cpr001l00asm)
> Or you can use partials CPR Names (ie cpr001)
> Or you can use wildcards! (ie cpr%asm finds all CPRs in ASM!)

[            ] — 505d

> If you know the CID please type it below.
> You can use full CIDs (ie 40.QGDA.123456)
> Or you can use partials CIDs (ie 40.QG)

[            ] — 505e

> If you know the UID please type it below.
> You can use full UIDs (ie 20629.614979)
> Or you can use partials UIDs (ie 40.QG)

[            ] — 505f

SUBMIT

Advanced Mode — 510

Common DIA Queries

Invalid CIDs :
- All Interfaces
- Interfaces that are not Shutdown
- Interfaces that are Shutdown Interfaces Descriptions with BPROV :
- All Interfaces
- Interfaces that are not Shutdown
- Interfaces that are Shutdown No Bandwidth Statement :
- All Interfaces
- Interfaces that are not Shutdown
- Interfaces that are Shutdown Sub Interfaces with no IP Address :
- All Interfaces
- Interfaces that are not Shutdown
- Interfaces that are Shutdown Interfaces without Access List 115 :
- All Interfaces
- Interfaces that are not Shutdown
- Interfaces that are Shutdown CPRs and Bundled Interfaces :
- All CPR/Bundled Interfaces
- Interfaces that are not Shutdown
- Interfaces that are Shutdown

Interface Hunter

There are currently 5223 routers and 46974 interfaces in this database.

You are currently in Advanced Mode!
Click here to return to basic mode.

520

SUBMIT

In the field above you can imput MySQL commands to query the database directly.
HOWEVER!!! You are limited to "SELECT" QUERIES ONLY.

| The table name is Interfaces | |
|---|---|
| Valid Fields are: | |
| Host | Router the Interface is on. i.e. cer00asm |
| Interface | The actual interface. i.e. Serial1/0/0.1 |
| Host_Interface | The actual Host Interface. i.e. Serial1/0/0 |
| Description | The interface description. |
| CID | The Circuit ID which has been extracted from the description. |
| UID | The UID which has been extracted from the description. |
| IP_Circuit | IP Address and Subnet on the Circuit Interface. |
| IP_Public | IP Addresses and Subnets staticly routed to the Circuit Interface. |
| Bandwidth | Information in the Bandwidth statement. |
| DLCI_PVC | The DLCI or ATM PVC information. |
| ACL | Access-Lists (if any) applied and which direction they are applied. |
| CPR_Name | CPR Attached to the circuit (if any). (ie cpr113i00asm) |
| Shutdown | Tells if the interface is admin down. |

FIG. 5B

Interface Hunter

Found 13 Interfaces

Click on the Host Router to view its config.
Click on the Bundled Router to view its config.
Click on the Interface for details on the Interface.

| Host | Interface | CPR Name | Interface Description | Shutdown? |
|---|---|---|---|---|
| ber00flo | ATM4/0/0.3 | None | FBA\:Scientific_Games_International | No |
| ber01flo | ATM3/0.3 | None | FBA\:Scientific_Games_International | No |
| ber01chs | ATM3/0.3 | None | FBA\:Scientific_Games_International | No |
| cer01asp | ATM0/0/0.3 | None | FBA\:Scientific_Games_International | No |
| cer01clt | ATM0/0/0.34 | None | FBA\:Scientific_Games | No |
| ber01ags | ATM3/0.41 | None | DESC:F6-N-EARTH-LINK-SCIGAMES-CPVPN | No |
| cer01cae | Serial0/0/1 | None | UTC:6C95-534215; CID-9C.C1D-SDC651-NAME:Scientific_Games_International | No |
| cer00cae | Serial0/0/95 | None | UTC:26C93-534225; CID-9C.C1D-SDC55-NAME:Scientific_Games_International | No |
| cer00clt | aTM0/0/0.34 | None | FBA\:Scientific_Games | No |
| ler00asm | Serial0/0/0.1 | None | UTC:28232-62552; CID-3ETHG1-EC0023 NAME:Scientific_Games_International_DESC:CPE | No |
| cer00cae | aTM0/0/0.26 | None | FBA\:Scientific_Games_International | No |
| ber00ags | aTM0/0/0.41 | None | DESC:F6-N-EARTH-LINK-SCIGAMES-CPVPN | No |
| ber00chs | aTM0/0/0.3 | None | FBA\:Scientific_Games_International | No |

Return to Search Page

FIG. 5C

Interface Hunter

Click on the Host Router to view its config.
Click on the Bundled Router to view its config.
Click on the Host Interface for details on the Host Interface.
Click on the Interface for a real time details.

540

| | |
|---|---|
| Host : | ber01flo —— 545 |
| Interface : | ATM3/0.3 —— 550 |
| Host Interface : | ATM3/0 —— 555 |
| CPR Name : | None |
| CID : | None |
| UID : | None |
| Description : | RBAN:Scientific_Games_International; |
| IPs on Circuit : | 68.152.160.14 255.255.255.252 |
| Staticly Routed IPs : | None |
| Bandwidth : | 0 |
| DLCI or PVC : | None |
| Access-Lists : | 110 in |
| Shutdown : | No |

Raw Interface Config

560
```
interface ATM3/0.3 point-to-point
description RBAN:Scientific_Games_International;
ip address 68.152.160.14 255.255.255.252
ip access-group 110 in
no ip directed-broadcast
no atm enable-ilmi-trap
pvc 1/34
```

Return to Search Page

Inventory Hunter

605

There are currently 5144 routers in the Inventory Database

---

Please enter the information you would like me to search for below.
You can fill out any number of fields and I will show you if I find multiple matches!

---

> If you know the router please type it below
For example cer00asm.
Or you can use partials
For example just une "asm" as the router and I will search just ASM

[_____] — 610a

> If you would like to search by Chassis Type please type it below
For example 10008 or 7506. Or you can use partials
For example just use " 750" as the Chassis Type and I will search for anything that starts with 750
For this I would return 7506, 7507, or any other Chassis that starts with750

[_____] — 610b

☐ Display Chassis even if I do not search for one

> Search by Amount of Main Memory
[Any ▼] [Any ▼] — 610c
☐ Display Memory even if I do not search it > Search by IOS
Router is currently [Running ▼]
[Any IOS ▼] — 610d ☐ Display IOS even if I do not search for one

SUBMIT

FIG. 6A

Inventory Hunter

Results of Query
Query Returned 86 Matches — 615

| Host Name | cer00pns | cer00pns | IOS |
|---|---|---|---|
| cer00pns | 7507 | 268435456 | rsp-pv-mz.120-14.S8.bin |
| cer00aby | 7507 | 268435456 | rsp-pv-mz.120-14.S8 |
| cer00pns | 7507 | 268435456 | rsp-pv-mz.120-14.S8.bin |
| cer00pns | 7507 | 268435456 | rsp-pv-mz.120-14.S8.bin |
| cer00pns | cer00pns | 268435456 | rsp-pv-mz.120-14.S8 |
| cer00pns | cer00pns | 268435456 | rsp-pv-mz.120-14.S8.bin |
| cer00pns | cer00pns | cer00pns | rsp-pv-mz.120-14.S8.bin |
| cer00bix | cer00pns | cer00pns | cer00pns |
| cer00bna | cer00pns | cer00pns | cer00pns |
| cer00btr | 7507 | 268435456 | rsp-pv-mz.120-14.S8 |
| cer00cae | 7507 | 268435456 | rsp-pv-mz.120-14.S8.bin |
| cer00pns | 7507 | 268435456 | rsp-pv-mz.120-14.S8.bin |
| cer00chs | 7507 | 268435456 | rsp-pv-mz.120-14.S8.bin |
| cer00clt | 7507 | 268435456 | rsp-pv-mz.120-14.S8.bin |
| cer00pns | 7507 | 268435456 | rsp-pv-mz.120-14.S8.bin |
| cer00pns | 7507 | 268435456 | rsp-pv-mz.120-14.S8.bin |
| cer00gnv | 7507 | 268435456 | rsp-pv-mz.120-14.S8.bin |

620 points to the first two rows (cer00pns, cer00aby)

FIG. 6B

Inventory Hunter cer00asm
Click here to view Current Configuration

625 — General Information

| Chassis Type | 7507 |
|---|---|
| IOS Image | rsp-pv-mz.120-14.S8 |
| Main Memory | 268435456 |
| NVRAM | 126968 |
| Free/Total Card Slots | 1 / 7 |

630 — General Statistics

| # of BGP Sessions | 7 |
|---|---|
| # of Interfaces | 34 |
| # of IP VPN Interfaces | 0 |

635 — Flash Information

| Physical Location | Description | Total Size |
|---|---|---|
| bootflash | Boot Flash | 7602176 |
| slot0 | PCMCIA Slot 0 Flash | 16384000 |

640 — Card Information

| Card Descriptions | Serial Number | Hardware Version | Software Version |
|---|---|---|---|
| Environmental Monitor | 9969711 | 1.1 | 0 |
| Versatile Interface Processor | 15100006 | 2.00 | 22.20 |
| Serial T3 Port Adapter | 12348701 | 1.0 | not available |
| Serial T3 Port Adapter | 16730224 | 1.0 | not available |
| Serial Port Adapter | 12360714 | 1.13 | not available |
| Ethernet Port Adapter | 6633739 | 1.5 | not available |
| ENHANCED ATM DS3 Port Adapter | N/A | 2.0 | not available |
| FastEthernet Port Adapter (TX-ISL) | 27515041 | 1.5 | not available |
| Versatile Interface Processor | 12636441 | 2.00 | 22.20 |
| Serial Port Adapter | 11559735 | 1.13 | not available |
| FastEthernet Port Adapter (TX-ISL) | 11527232 | 1.1 | not available |
| Ethernet Port Adapter | 4957103 | 1.14 | not available |
| ENHANCED ATM DS3 Port Adapter | 14077328 | 2.0 | not available |
| R5000 | 12685713 | 1.3 | 12.0 |
| Versatile Interface Processor | 8191560 | 2.00 | 22.20 |
| Versatile Interface Processor | 11753386 | 2.00 | 22.20 |
| Versatile Interface Processor | 18573992 | 2.00 | 22.20 |

Return to Inventory Home Page

FIG. 6C

BGP Hunter

There are currently 514 Routers in 25 ASes with connections to 211 different ASes Please enter the the information you would like me to search for below:
You can fill out any number of fields and I will show you if I find multiple matches!

>If you know the router please type it below
For example cer00asm,
Or you can use partials
For example just use "asm" as the router and I will search just ASM

[_____] ~ 710a

>If you would like to search by AS Number please type it below
For example 6197 or 8062.

[_____] ~ 710b

>If you would like to search by the BGP Description please type it below
For example US_Naval_Air_Station.
Or you can use partials
For example just use "Station" as the description
and I will search for anything that contains "Station"

[_____] ~ 710c

>If you would like to search by the BGP Neighbor IP Address please type it below
For example 68.152.191.230.
Or you can use partials
For example just use "68.152" as the IP Address
and I will search for anything that contains "68.152"

[_____] ~ 710d

SUBMIT

FIG. 7A

BGP Hunter

Click on the Router to view the Session Details.
Click on the IP to search for another session ID to that IP.
Click on the Local/Remote AS to search for another session in that AS.
Click on the Description to search for another session with the same description.

There are 7 Routers that match the search criteria:

| Host | Local AS | Remote AS | IP | Description | Shutdown |
|---|---|---|---|---|---|
| cer00as- | 6127 | 6457 | 205.252.37.127 | AS500ASM-RR | no |
| cer00as- | 6127 | 6457 | 205.252.37.126 | AS001ASM-RR | no |
| cer00as- | 6127 | 65529 | 172.25.61.166 | Institute of Nuclear Power Operations (INPO) | no |
| cer00as- | 6127 | 15152 | 172.25.8.158 | Synkronus Inc asno6/2/0.2 | yes |
| cer00as- | 6127 | 12272 | 172.254.132 | pDC | yes |
| cer00as- | 6127 | 12272 | 172.254.13- | pDC | yes |
| cer00as- | 6127 | 65050 | 158.9.249.252 | SDS | no |

720 ─ 725 ─ 730 ─ 735 ─ 740 ─ 715

Return to BGP Hunter Start Page

FIG. 7B

BGP Hunter

Click on the Router to view its configuration
Click on the IP to search for another session to that IP
Click on the Local/Remote AS to search for another session in that AS
Click on the Description to search for another session with the same description

| | |
|---|---|
| Host : | cer00asm |
| Local AS : | 6197 |
| Remote AS : | 6197 |
| IP : | 205.152.37.127 |
| Description : | IXC00ASM_RR |
| Distribute List (IN) : | None |
| Distribute List (OUT) : | None |
| Route-Map (IN) : | None |
| Route-Map (OUT) : | None |
| Shutdown : | no |

— 745

Raw BGP Configuration

Raw Interface Config

```
neighbor 205.152.37.127 remote-as 6197
neighbor 205.152.37.127 description IXC00ASM_RR
neighbor 205.152.37.127 update-source Loopback1
neighbor 205.152.37.127 next-hop-self
neighbor 205.152.37.127 send-community
neighbor 205.152.37.127 route-map IXC00_BGP_IN in
neighbor 205.152.37.127 route-map IXC_BGP_OUT out
```

Return to BGP Hunter Start Page

METHODS, SYSTEMS AND COMPUTER PROGRAM PRODUCTS FOR NETWORK ELEMENT INFORMATION MANAGEMENT

FIELD OF THE INVENTION

The present invention is directed to communication networks, and more particularly, to systems, methods and computer program products for managing network elements in communications networks.

BACKGROUND OF THE INVENTION

Modern communications networks may include thousands of different network elements of various types and made by different manufacturers. For example, as shown in FIG. 1, a conventional communications network 100 can include up to thousands or more network elements, such as network elements 105a . . . 105n. Network elements 105a . . . 105n may include routers 105a, switches 105b, servers 105c, and/or other equipment. Fewer or more elements than are illustrated in FIG. 1 may be provided. The design and operation of the communications network 100 and the network elements 105a . . . 105n are well known to those having skill in the art and need not be described further herein.

Management systems, methods, and computer program products are widely used in communications networks to manage these network elements. The management systems, methods, and computer program products can provide information regarding the status and configuration of network elements from each element to a network management center via a network management protocol. Well-known network management protocols, such as Simple Network Management Protocol (SNMP) and Common Management Information Protocol (CMIP), may enable access to information for network elements defined in a Management Information Base (MIB).

Examples of management systems include Cisco's CiscoWork™ and TTI Telecom's Netrac™ Operations Support System (OSS). CiscoWorks™ may allow access to a multitude of network information for Cisco switches, access servers, and routers. Additional information about CiscoWorkS™ may be found at http://www.cisco.com/warp/public/cc/pd/wr2k/rsmn/index.shtml.

Netrac™ may allow service providers to effectively monitor and manage multi-vendor networks, but may require several days to scan all of the elements in a large (5000+device) network. Additional information about Netrac™ may be found at http://www.tti.co.il/.

SUMMARY OF THE INVENTION

According to various embodiments of the invention, a method of monitoring network elements in a communications network includes querying the network elements for reboot and/or reconfiguration event data, identifying a group of the network elements responsive to the querying, and updating information for the identified group of network elements in a network configuration database.

In further embodiments, the method may include extracting information from the identified group of network elements into independently searchable databases. The independently searchable databases may respectively include interface information, inventory information, routing information, IP address information, customer information, and configuration assurance information.

In additional embodiments, the step of querying the network elements for reboot and/or reconfiguration event data may include querying the network elements for reboot and/or reconfiguration timestamps. Also, the step of identifying a group of network elements responsive to the querying may include comparing the current timestamps to prior timestamps stored in a temporary database.

In further embodiments, the steps of querying, identifying, and updating may be repetitively performed to generate an archival network configuration database including a configuration history. In addition, the method may include querying the archival network configuration database and generating a configuration comparison report for a network element between specified times responsive to a user request.

In additional embodiments, the method may include displaying all customers connected to a particular network element responsive to a user request. The method may also include querying the network for added and/or removed network elements and updating the network configuration database with information for the added and/or removed elements.

According to further embodiments of the invention, a data processing system includes a network configuration database and a change monitor configured to query network elements in a communications network for reboot and/or reconfiguration event data. The change monitor is also configured to identify a group of the network elements responsive to the querying and to update the database with information for the identified group of network elements.

In additional embodiments of the invention, a computer program product for monitoring network elements in a communications network includes computer code embodied in a storage medium. The computer code includes code configured to query the network elements for reboot and/or reconfiguration event data, code configured to identify a group of the network elements responsive to the querying, and code configured to update information for the identified group of network elements in a network configuration database.

Other methods, systems, and/or computer program products according to embodiments will be or become apparent to one with skill in the art upon review of the following drawings and detailed description. It is intended that all such additional methods, systems, and/or computer program products be included within this description, be within the scope of the present invention, and be protected by the accompanying claims.

BRIEF DESCRIPTION OF THE DRAWINGS

Figure 4C:
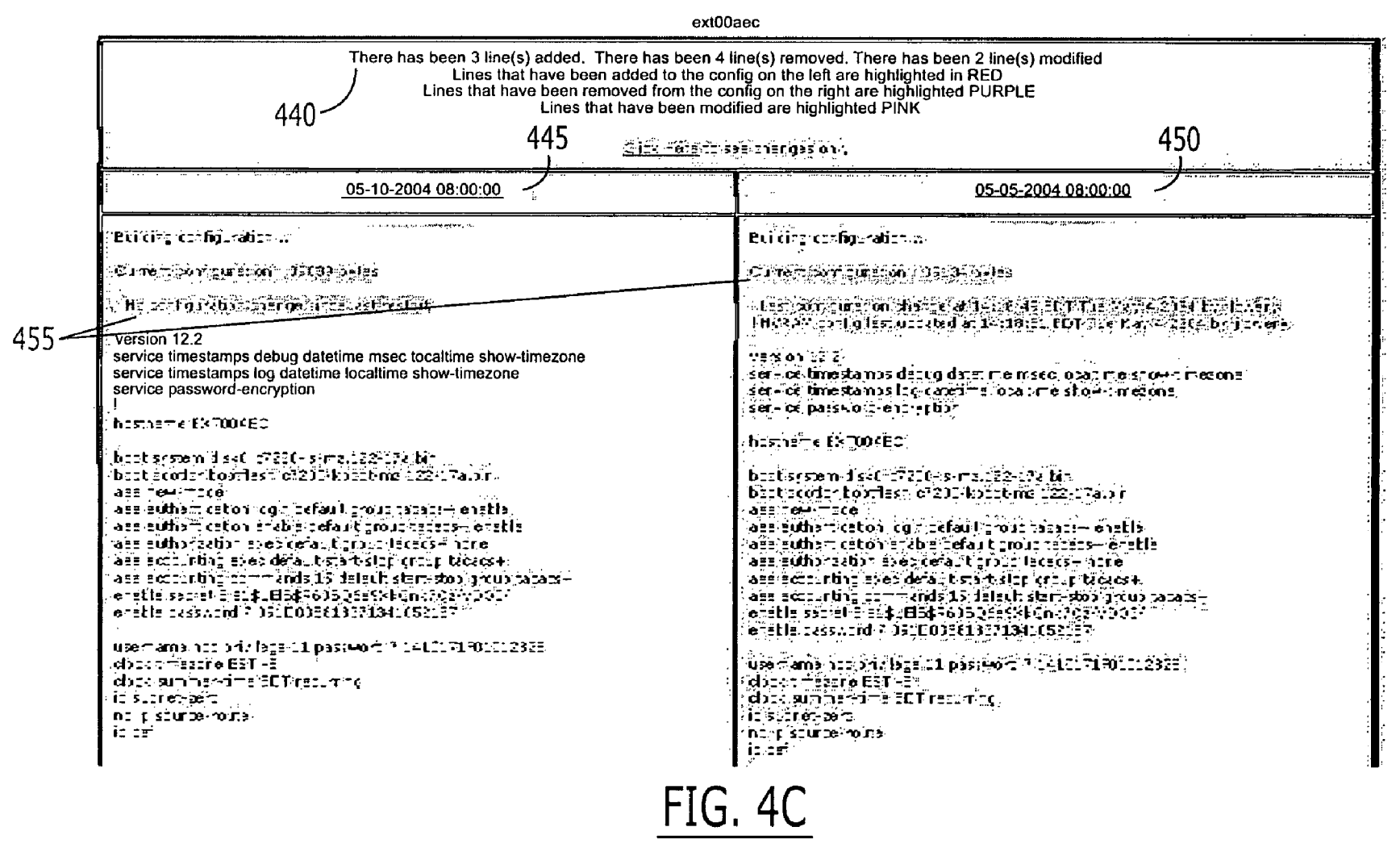

FIG. 4 to FIG. 8 are screenshots illustrating exemplary user interfaces for network element information management systems according to various embodiments of the present invention.

DETAILED DESCRIPTION OF THE INVENTION

Figure 1:
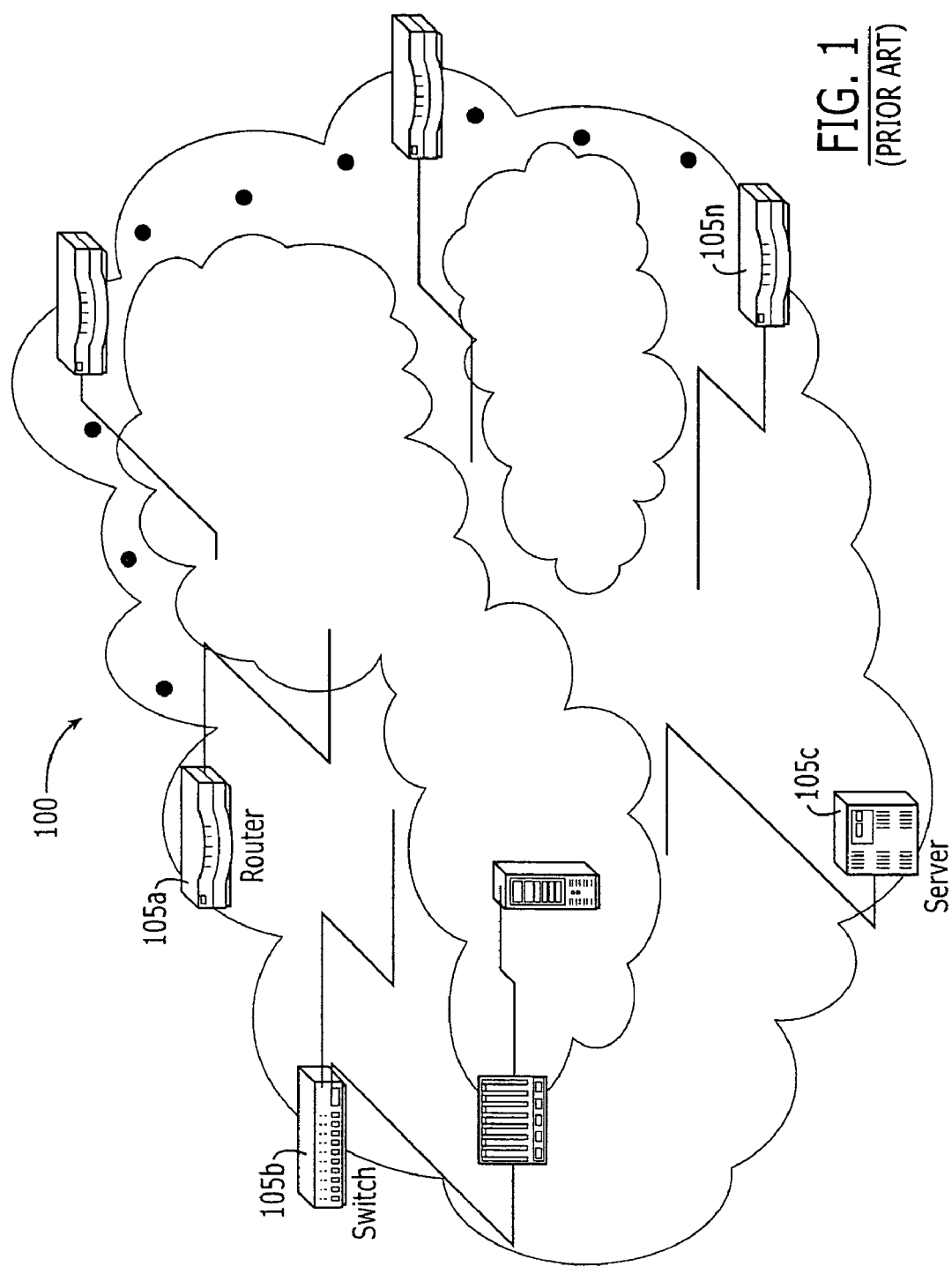
FIG. 1 illustrates a conventional communications network.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will be understood that the term "and/or" as used herein refers to and encompasses any and all possible combinations of one or more of the associated listed items.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be used including hard disks, CD-ROMs, optical storage devices, or magnetic storage devices.

Computer program code for carrying out operations of the present invention may be written in an object oriented programming language, such as Java® or C++. However, the computer program code for carrying out operations of the present invention may also be written in conventional procedural programming languages, such as the "C" programming language or assembly language. The program code may execute entirely on the user's computer, partly on the user's computer, as a standalone software package, partly on the user's computer and partly on a remote computer, or entirely on the remote computer. In the latter scenario, the remote computer may be connected to the user's computer through a local area network (LAN) or a wide area network (WAN).

The present invention is described below with reference to flowchart illustrations and/or block diagrams of methods, systems, and computer program products according to some embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. All publications, patent applications, patents, and other references mentioned herein are incorporated by reference in their entirety.

Figure 2:
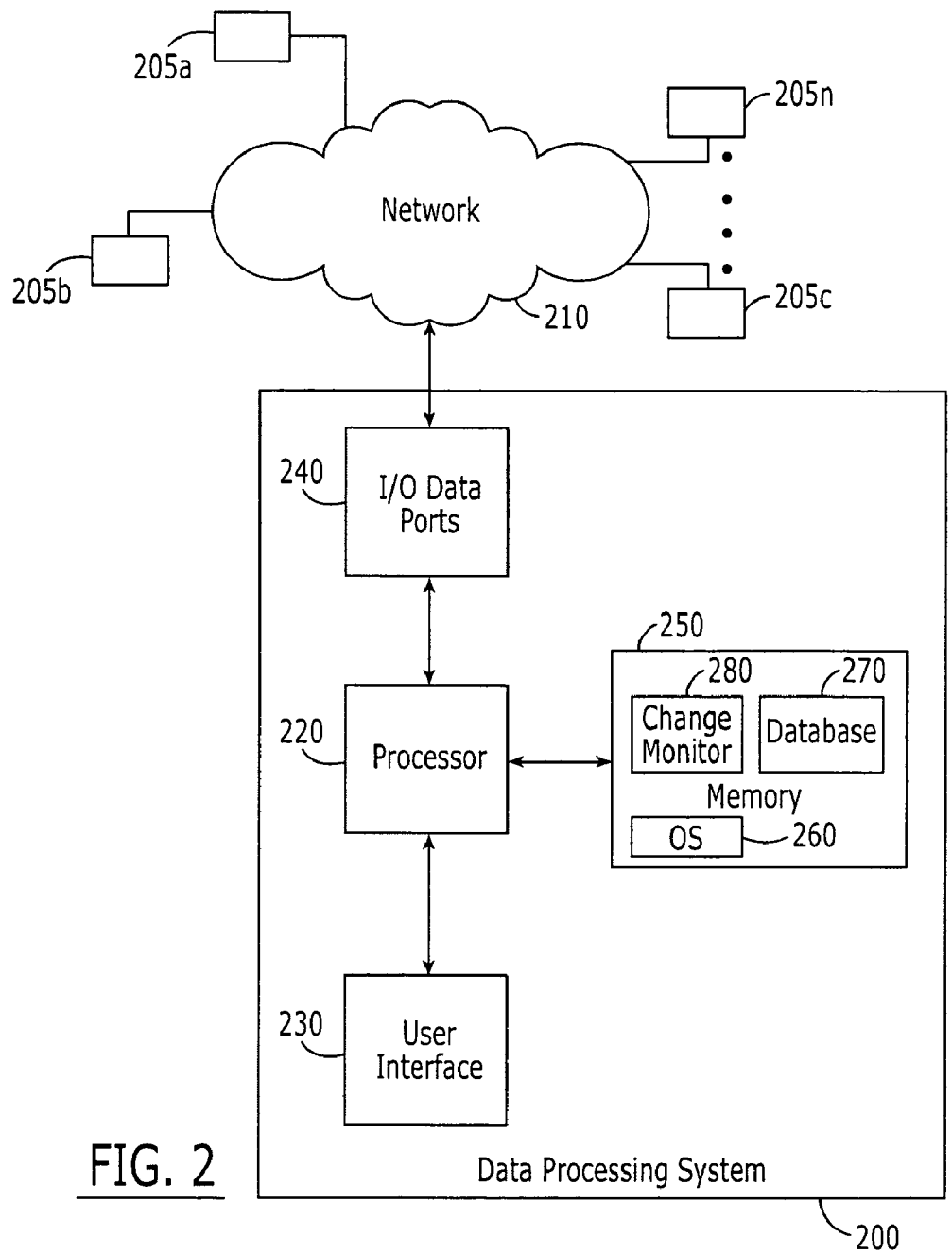
FIG. 2 is a block diagram illustrating data processing systems for monitoring network elements in a communications network according to various embodiments of the present invention.

FIG. 2 illustrates a data processing system for monitoring network elements according to various embodiments of the invention. Referring to FIG. 2, the data processing system 200 is connected to network elements 205 . . . 205n of a communications network 210. The network 210 may be public and/or private, wired and/or wireless, and/or may include the World Wide Web. The data processing system 200 may be distributed throughout a network or may be centrally located, for example, in a central office (CO). The network elements 205a . . . 205n may include routers 205a, switches 205b, and/or other equipment. Fewer or more elements than are illustrated in FIG. 2 may be provided. The data processing system 200 communicates with the network elements 205a . . . 205n via a network management protocol, such as SNMP. As such, information regarding the status and configuration of the network elements 205a . . . 205n is accessible via the data processing system 200.

Still referring to FIG. 2, the data processing system 200 includes a processor 220, a user interface 230, I/O data ports 240, and memory 250. The memory 250 includes an operating system 260, a network configuration database 270, and a change monitor 280. The network configuration database 270 stores information for every element or device in the network 210. The database 270 is accessible via the user interface 230. The user interface 230 may be web-based.

According to some embodiments of the invention, the change monitor 280 intermittently queries every network device 205a . . . 205n to determine if changes to the network 210 have occurred. More particularly, the change monitor 280 queries the network devices 205a . . . 205n using a network management protocol, such as SNMP, to determine if any of the devices 205a . . . 205n in the network 210 have been re-booted and/or reconfigured. The change monitor 280 may query the network 210 on a daily basis, or more or less frequently. An open or proprietary query may be used by the change monitor 280.

By querying for reboot and/or reconfiguration event data, the change monitor 280 can quickly detect changes to the network elements 205a . . . 205n. As such, methods, systems, and computer program products according to some embodiments of the invention may operate more quickly than conventional management systems, which may require a comparison between the current configuration of every element in the network and information from a prior query to determine if changes have been made.

If changes are detected, information downloaded may be limited to only those devices that have been altered. For example, if a device has been rebooted, the change monitor 280 may directly access the device and obtain the reason for rebooting, which may then be stored in the database 270. Also, if a device has been reconfigured, the change monitor 280 may access the device, obtain a copy of the current device configuration, and store the current configuration in the database 270.

Copies of prior configurations for the device may also be stored in the database 270 to provide a configuration history for the device. The configuration history may be accessed to compare the current configuration of a device with prior configurations for that same device via the user interface 230. This feature may be useful in troubleshooting for the device. For example, as some configuration files may be over 3000 lines in length, finding exactly which device parameters have been modified may help isolate problems with the device more quickly. In some embodiments, the modified configuration information may be highlighted when displayed via the user interface 230. The configuration history may be stored in an archival network configuration database. It will be appreciated that the archival network configuration database may be organized as part of the database 270, or may be separate from the database 270.

The change monitor 280 can also separate particular information from the device configuration, which may be stored in independently searchable databases. Examples of such information may include interface information, Border Gateway Protocol (BGP) information, Internet Protocol Virtual Private Network (IPVPN) information, routing information, IP address information, customer information, and/or configuration assurance information. It will be appreciated that the independently searchable databases may be organized as part of the database 270, or may be separate from the database 270. The information in each independently searchable database may be accessed via the user interface 230. As such, specific information may quickly be found without searching through every device configuration in the entire database 270. For example, by separating IP address information into a particular database, the change monitor 280 may avoid a time-consuming line-by-line search through the configuration file for every network device in order to find this information. Such independently searchable databases may also be useful for data mining, e.g. analyzing data in the database 270 to identify patterns or relationships. Further, the change monitor 280 may utilize the information stored in the independently searchable databases to generate reports and/or statistical data for the network 210 and/or for any particular network device.

In addition, the change monitor 280 can obtain hardware/inventory information from the devices in the network 210 via a network management protocol, such as SNMP. This information may then be stored in the database 270 and/or one of the independently searchable databases. As such, users may quickly verify when devices have been added to and/or removed from the network 210 via the user interface 230. The change monitor 280 may also display all customers connected to a particular network device via the user interface 230 upon a request by a user. Further, after the entire network 210 has been queried, the change monitor 280 can generate a summary report for the network 210, including information such as the number of new devices found, the number of devices changed and/or booted, the number of configuration lines added, removed, and/or modified, and the number of devices that did not respond.

Figure 3A:
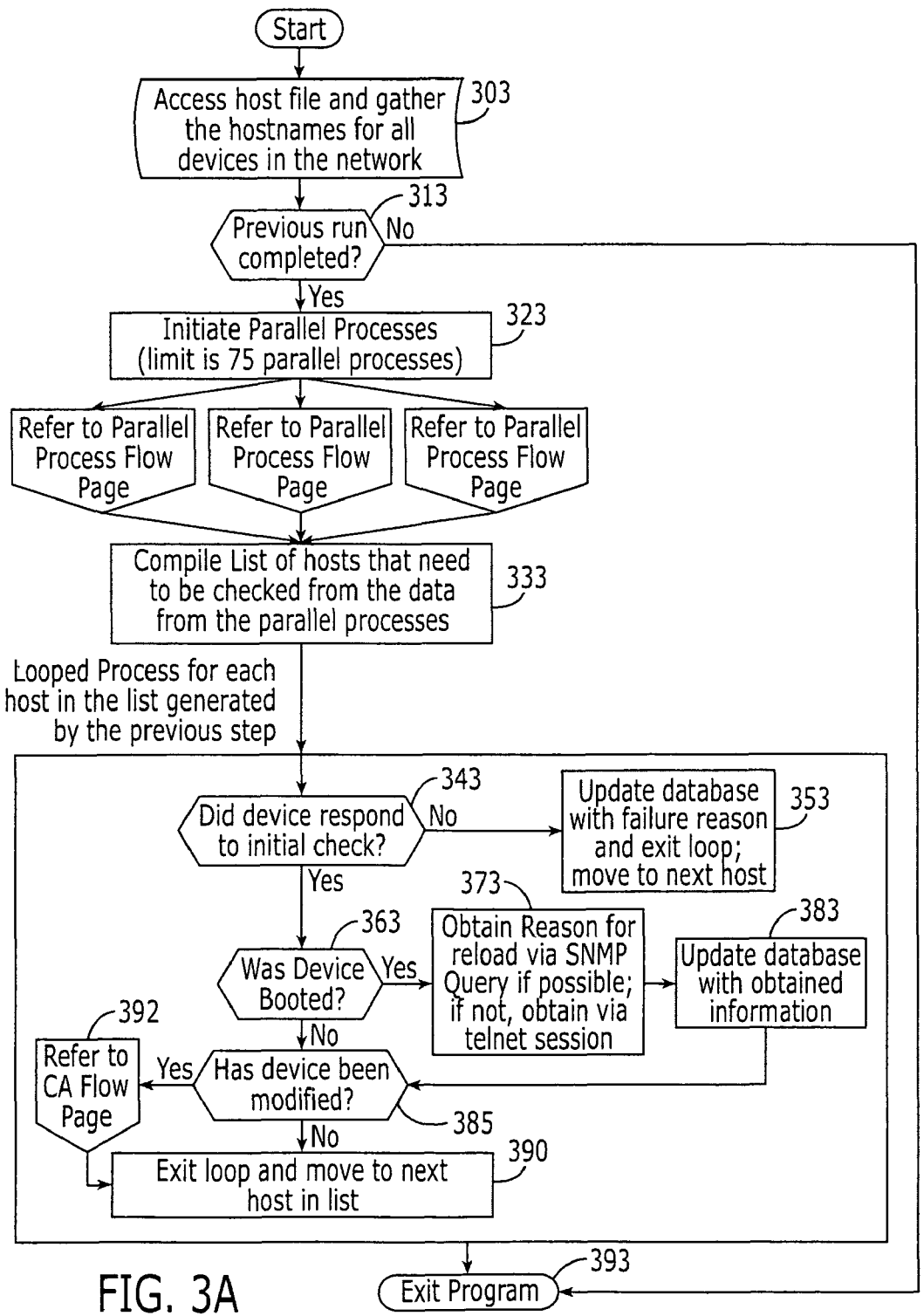
FIG. 3A to FIG. 3C are flowcharts illustrating exemplary operations for monitoring network elements in a communications network according to various embodiments of the present invention.
Figure 3B:
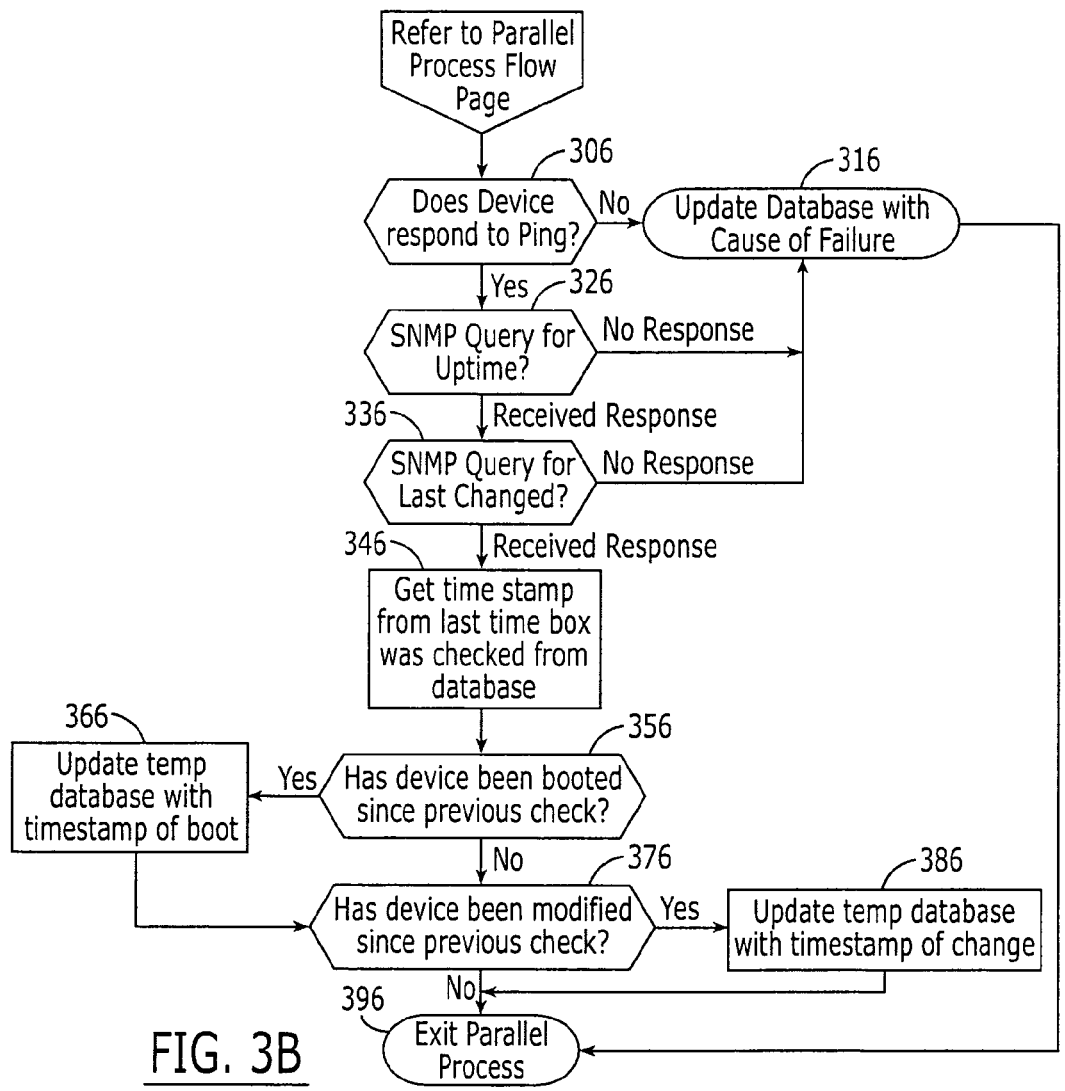
Figure 3C:
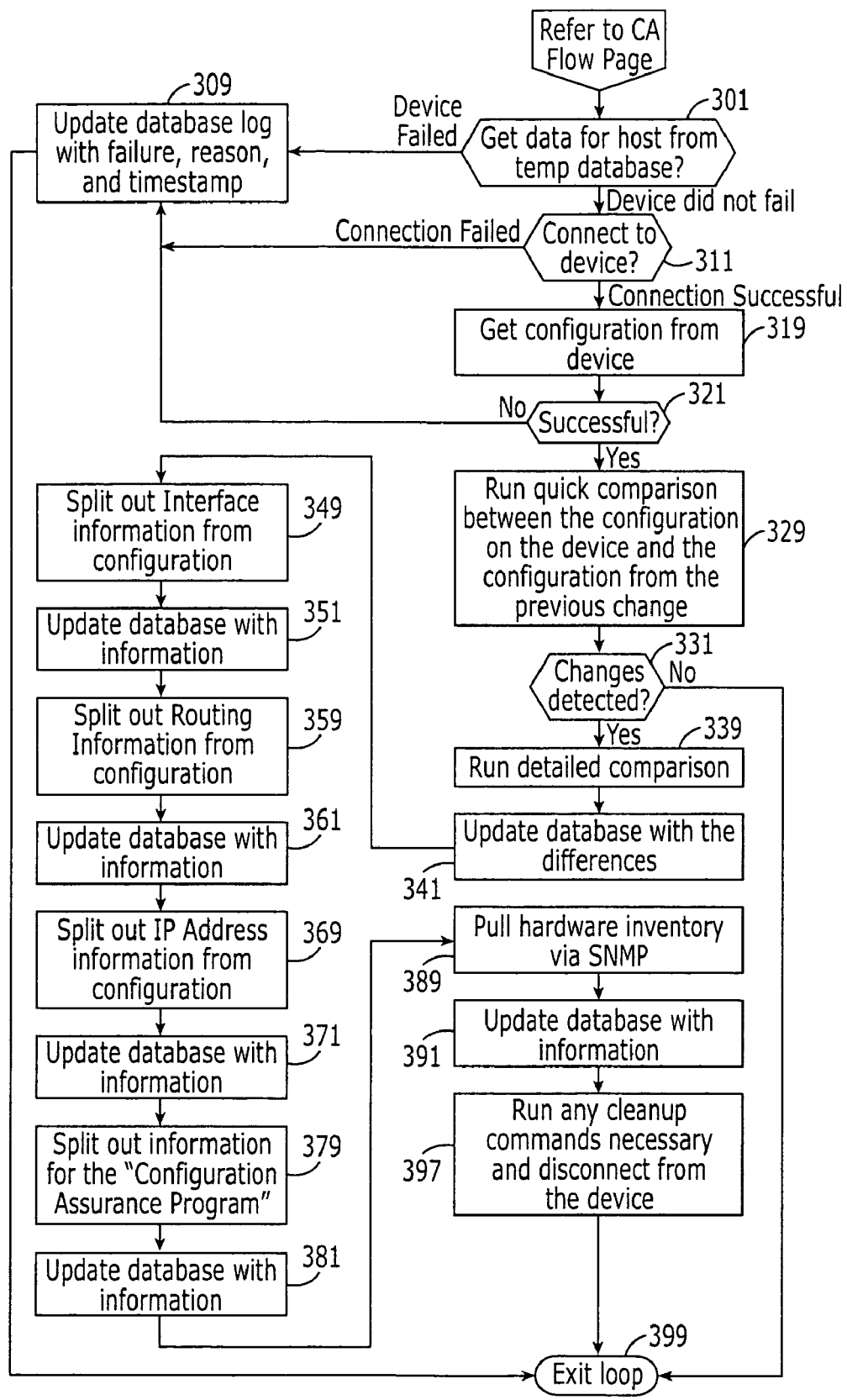

Exemplary operations for monitoring network elements according to various embodiments of the invention are illustrated in FIG. 3A to 3C. Referring to FIG. 3A, the hostnames for all devices 205a . . . 205n in the network 210 are gathered (block 303). If it is determined that a previous query has not yet been completed (block 313), the change detection process is aborted (block 393). If the previous query has been completed, a parallel query for reboot and/or reconfiguration event data for up to 75 devices is performed (block 323), as illustrated in FIG. 3B.

Referring to FIG. 3B, a ping is sent to a particular device in the network 210 (block 306). If the device does not respond to the ping, the database 270 is updated with the cause of failure (block 316), and the parallel query for that device is aborted (block 396). If the device responds to the ping, an SNMP query is sent to the device to determine the amount of time the device has been in operation (block 326). The device may respond with a timestamp from its most recent reboot. If there is no response, the database 270 is updated with the cause of failure (block 316), and the query for that device is aborted (block 396). If a response is received, a further SNMP query is sent to the device to determine when the device was last modified (block 336). The device may respond with a timestamp from its most recent reconfiguration. If the device does not respond, the database 270 is updated with the cause of failure (block 316), and the query for that device is aborted (block 396). If a response from the device is received, timestamps for the last device reboot and reconfiguration are obtained from a temporary database (block 346). It will be appreciated that the temporary database may be a part of the network configuration database 270, or may be separate from the database 270. The timestamps stored in the temporary database may be compared with current timestamps from the device to determine whether a reboot and/or reconfiguration has occurred. If it is determined that the device has been rebooted (block 356), the temporary database is updated with the timestamp of the reboot (block 366). If it is determined that the device has been modified (block 376), the temporary database is updated with the timestamp of the modification (block 386). The parallel query is then completed (block 396).

Referring again to FIG. 3A, the devices responsive to the parallel queries for reboot and reconfiguration event data are identified, and a list of the devices is compiled (block 333). An initial query is then sent to each device on the list (block 343). If the device does not respond, the database 270 is updated with the reason for failure, and the query is performed on the next device on the list (block 353). If the device responds, it is determined whether the device has been rebooted and/or modified. If the device has been rebooted (block 363), a reason for the reboot is obtained via SNMP query if possible, and if not, via telnet session (block 373). The database 270 is then updated with the reason for the reboot (block 383). It is then determined whether the device has been modified (block 385). If not, an initial check is performed on the next device on the list (block 390). If the device has been modified, the device is directly accessed (block 392), as shown in FIG. 3C.

Referring now to FIG. 3C, data for the device is obtained from a temporary database (block 301). If the data indicates that the device failed any of the previous inquiries, the database 270 is updated with the reason for failure and the timestamp (block 309), and the operation is terminated (block 399). If the data indicates that the device did not fail, a connection to the device is established (block 311). If the connection fails, the database 270 is updated with the reason for failure and the timestamp (block 309), and the operation is terminated at block 399. If the connection is successful, the current configuration for the device is obtained (block 319). If the configuration cannot be obtained (block 321), the database 270 is updated with the reason for failure and the timestamp (block 309), and the operation is terminated (block 399). If the configuration is successfully obtained, a quick comparison is made between the current device configuration and the most recent prior device configuration stored in the database 270 (block 329). If no differences are detected (block 331), the operation is terminated (block 399). If differences are detected, a detailed comparison between the current and previous device configurations is performed (block 339). The database 270 is then updated with the differences/results of the comparison (block 341).

Still referring to FIG. 3C, interface information is then separated from the current device configuration (block 349) and stored in an independently searchable database (block 351). Next, routing information is separated from the current device configuration (block 359) and stored in another independently searchable database (block 361). Similarly, IP address information and configuration assurance information are separated from the current device configuration (blocks 369 and 379) and respectively stored in independently searchable databases (blocks 371 and 381). Hardware/inventory information is then obtained from the device via SNMP query (block 389) and stored in yet another independently searchable database (block 391). Any necessary cleanup commands are then run, and the connection to the device is terminated (block 397). The operation is then completed (block 399), and may be re-executed for the next device on the list.

FIG. 4 to FIG. 8 illustrate exemplary user interfaces for network element information management systems according to various embodiments of the present invention. FIG. 4A to 4C illustrate exemplary user interfaces for access to a router configuration archive database. Referring to FIG. 4A, the router configuration archive database may be accessed via the user interface 400 by entering a router name at the search prompt 405. Alternatively, a router may be selected from the list of recently modified routers 410 displayed in the table 415. Recent statistics 420 for the router configurations may also be displayed in the table 415. Referring to FIG. 4B, currently available configurations for the selected router, such as the current router configuration 425 or past router configurations 430 and 435, are displayed in response to the selection of a router. A comparison may be performed between any two of the currently available configurations. Referring to FIG. 4C, the results of a comparison between the current router configuration 425 and a past router configuration 430 is displayed. The comparison provides a summary 440 of the differences between the two configurations, as well as respective timestamps 445 and 450 for each configuration. Further, lines of the configuration that were added, removed, or modified are highlighted 455.

FIG. 5A to 5D illustrate exemplary user interfaces for access to an independently searchable interface information database. Referring to FIG. 5A, the user interface 500 displays a summary 502 of the information currently available in the database. The database may be accessed by entering a search criterion at one of the search prompts 505a-505f. The database may be searchable by device, company, interface, circuit ID, customer premise router (CPR) name, and/or UUNet ID. The user interface also displays an advanced mode 510 and some common advanced searches 515. Referring to FIG. 5B, the advanced mode 510 enables advanced searching by entering MySQL commands at the search prompt 520 to query the database directly. Referring to FIG. 5C, the results for the selected search are displayed in a table 525. An interface 530 may be selected from the table 525 to display all details for the interface 530. Alternatively, a host 535 may be selected from the table 525 to display the entire configuration for the host 535. Referring to FIG. 5D, a detailed list of attributes for the selected host and/or interface is displayed in a table 540. More specific details for the selected host may be obtained by selecting the hostname 545, the interface name 550, and/or the host interface 555 from the table 540. Further, interface configuration details 560 are also provided.

FIG. 6A to FIG. 6C illustrate exemplary user interfaces for access to an independently searchable inventory information database. Referring to FIG. 6A, the user interface 600 displays a summary 605 of the information currently available in the database. The database may be accessed by entering a search criterion at one of the search prompts 610a-610d. The database may be searchable by hostname, chassis type, amount of memory, and/or IOS version. Referring to FIG. 6B, the results of the selected search are displayed in a table 615. A hostname 620 may be selected from the table 615 to display further details for the host. Referring to FIG. 6C, detailed information for the selected host is displayed in tables 625, 630, 635, and 640.

FIG. 7A to FIG. 7C illustrate exemplary user interfaces for access to an independently searchable BGP information database. Referring to FIG. 7A, the user interface 700 displays a summary 705 of the information currently available in the database. The database may be accessed by entering a search criterion at one of the search prompts 710a-710d. The database may be searchable by router, AS number, BGP description, and/or BGP neighbor IP address. Referring to FIG. 7B, the results of the selected search are displayed in a table 715. A host 720, local AS 725, and/or remote AS 730 may be selected from the table 715 to display further details for the selection. An IP address 735 may also be selected from the table 715 to display all routers with a BGP session to the selected address. Further, a description 740 may be selected from the table 715 to display all BGP sessions with the selected description. Referring to FIG. 7C, further details for a selected host are displayed in a table 745.

Figure 8:
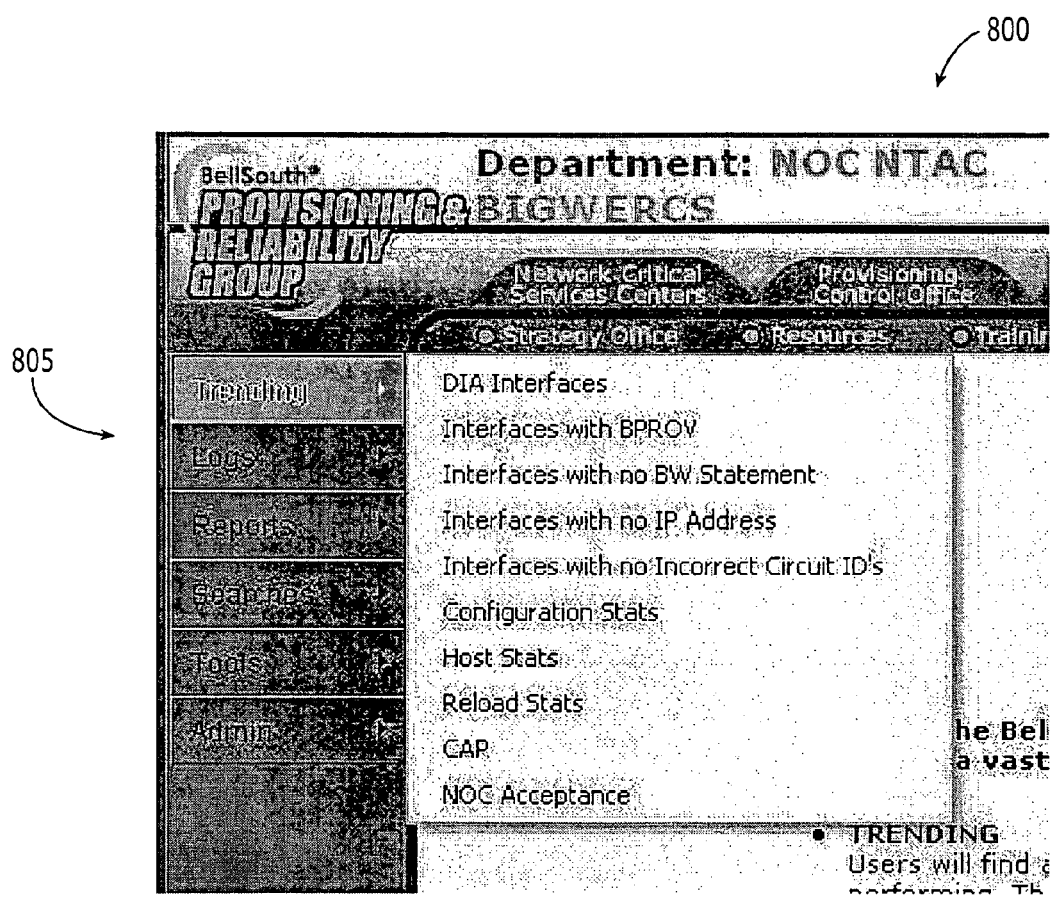

FIG. 8 illustrates an exemplary user interface for access to statistical data for network elements in a communications network. Referring to FIG. 8, the user interface 800 provides access to various forms of network data, such as trending, logs, reports, etc., responsive to selections from a menu 805.

Figure 9:
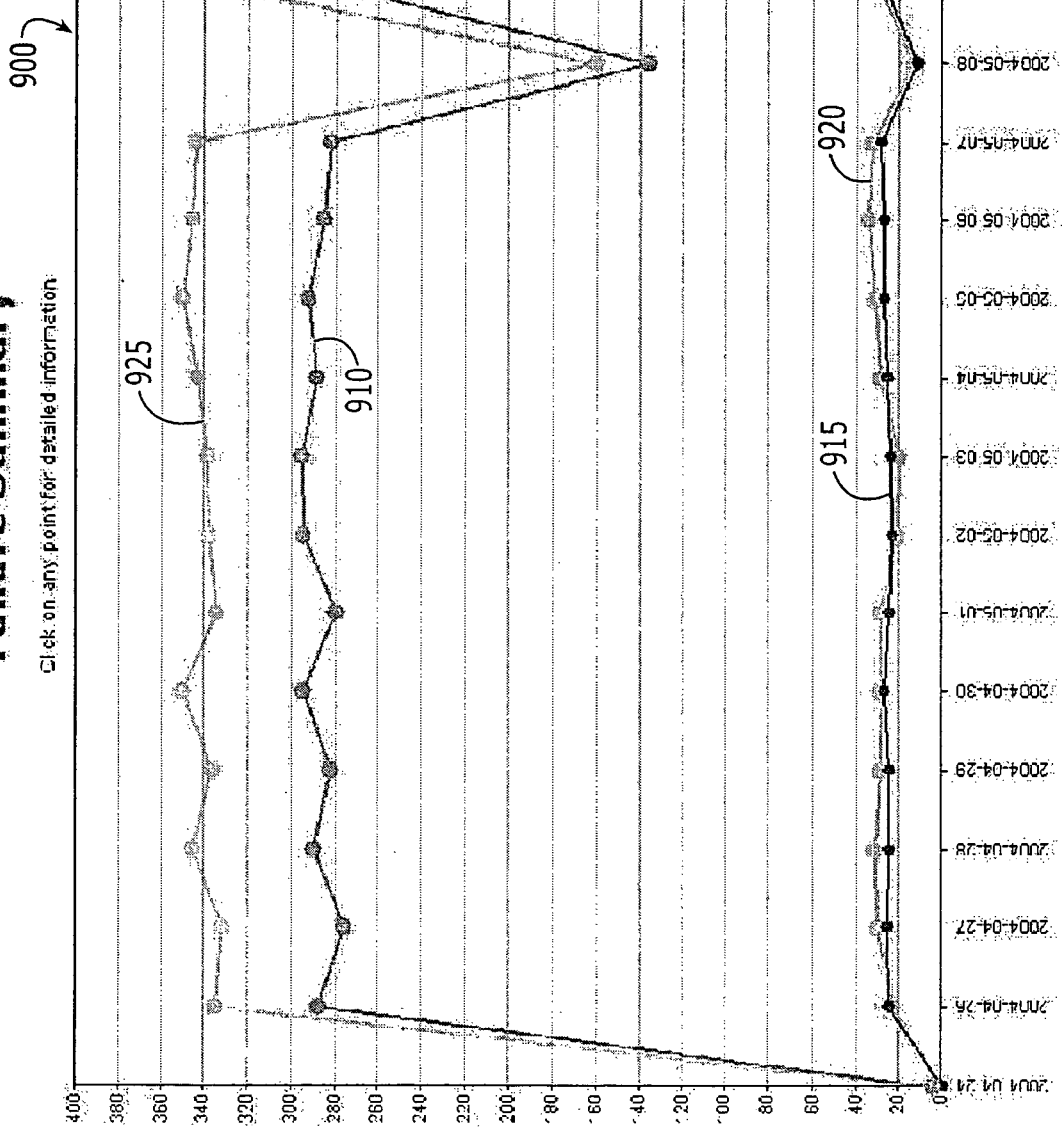
FIG. 9 is a graph illustrating failure statistics for network elements in a communications network generated by network element information management systems according to various embodiments of the present invention.

FIG. 9 to FIG. 11 are graphs generated by network element information management systems according to various embodiments of the present invention which illustrate statistical data for network elements in a communications network. The graphs may be displayed responsive to selections from the menu 805 of FIG. 8. FIG. 9 is a graph illustrating failure statistics for the network 210. As shown in FIG. 9, the failure summary 900 provides ping failures 910, SNMP failures 915, telnet failures 920, and the total failures 925 for the network 210. Detailed information may be obtained by clicking on any of the points illustrated in the graph.

Figure 10A:
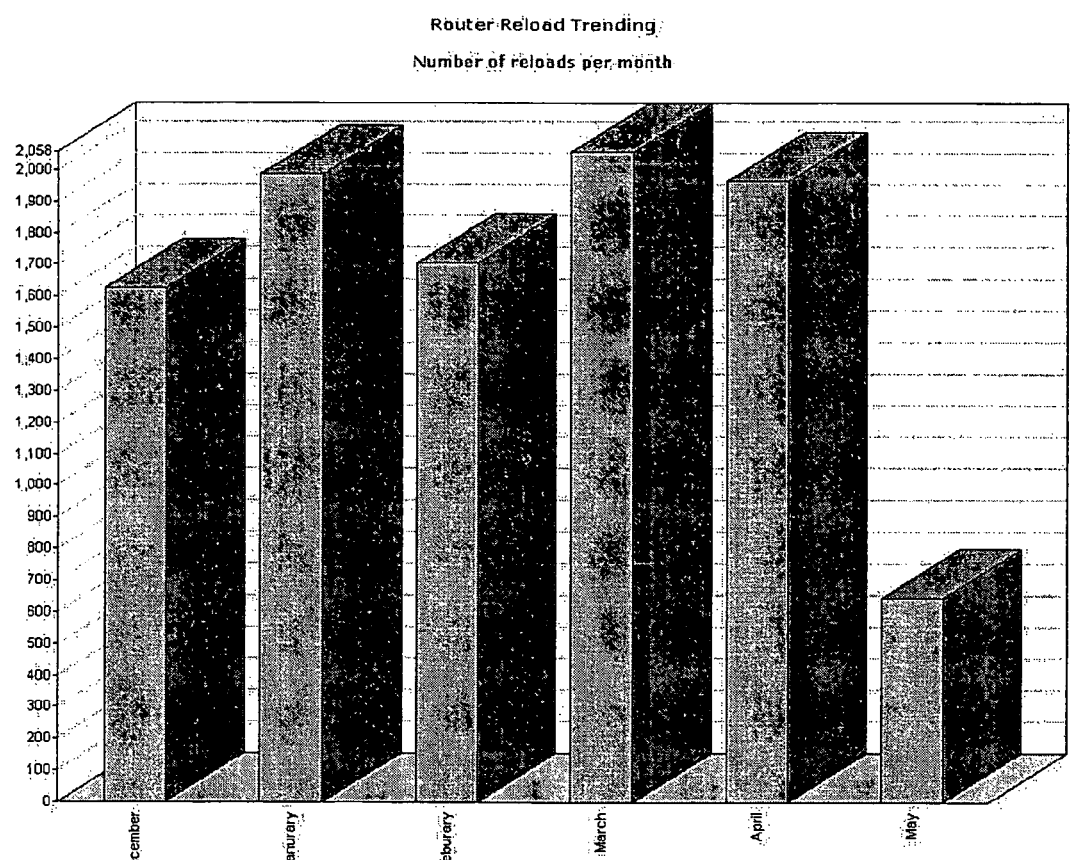
FIG. 10A to FIG. 10C are graphs illustrating reload statistics for network elements in a communications network generated by network element information management systems according to various embodiments of the present invention.
Figure 10B:
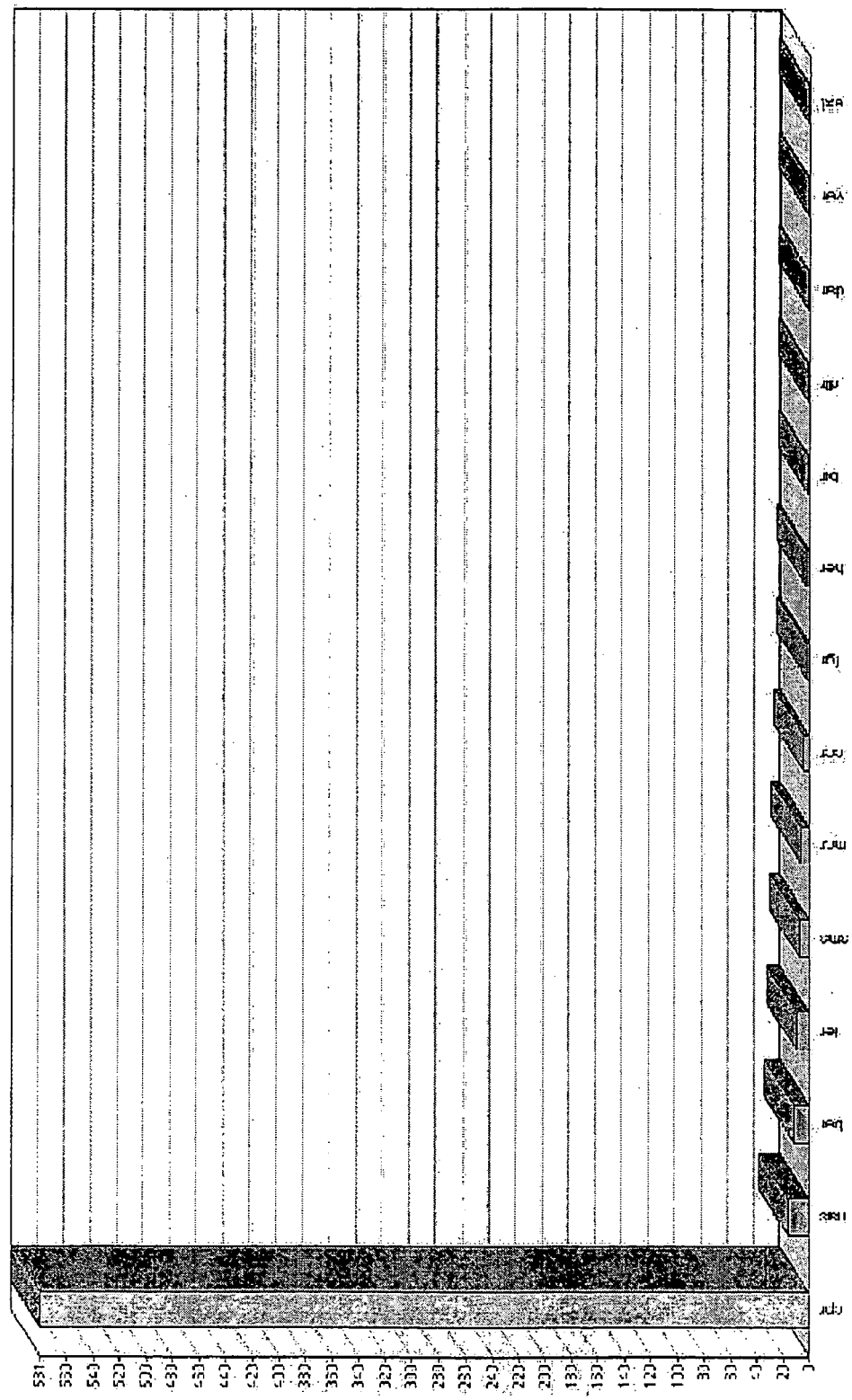
Figure 10C:
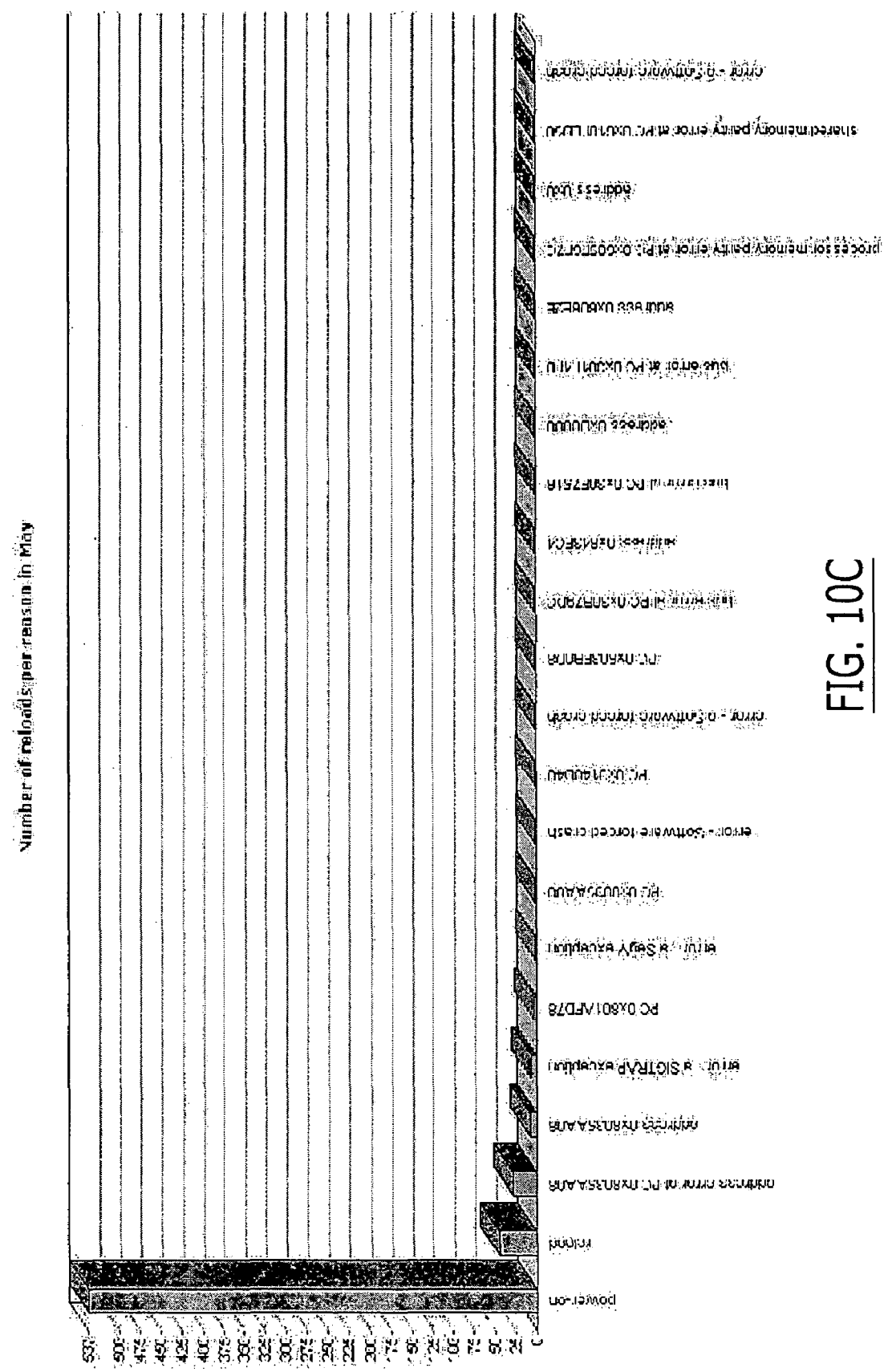

FIG. 10A to FIG. 10C are graphs illustrating reload statistics for the network 210. FIG. 10A illustrates the number of router reloads per month for a six-month period. FIG. 10B shows the number of reloads per specific device for the month of May. FIG. 10C displays the number of reloads in the month of May based on the particular reasons for the reloads.

Figure 11A:
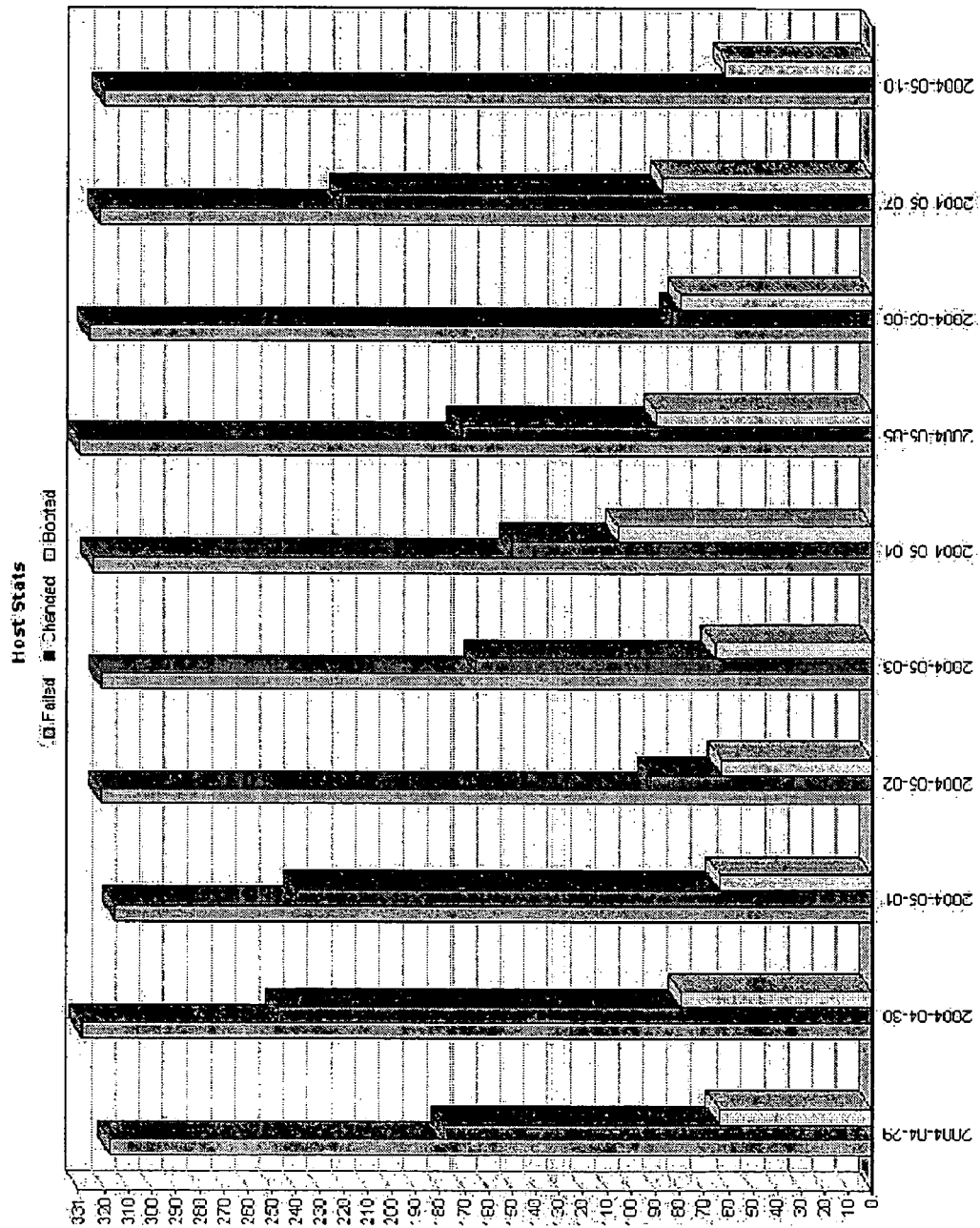
FIG. 11A to FIG. 11G are graphs illustrating interface statistics for network elements in a communications network generated by network element information management systems according to various embodiments of the present invention.
Figure 11B:
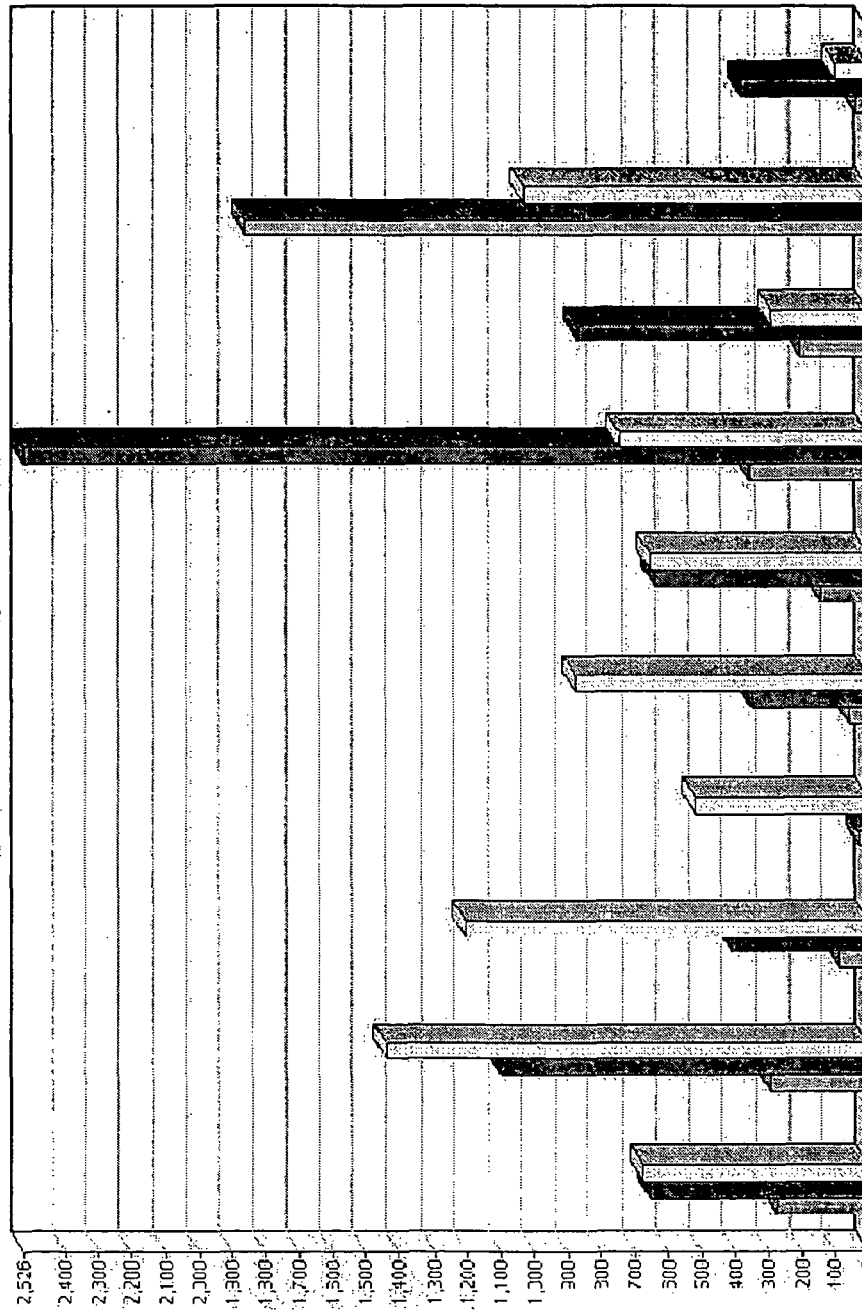
Figure 11C:
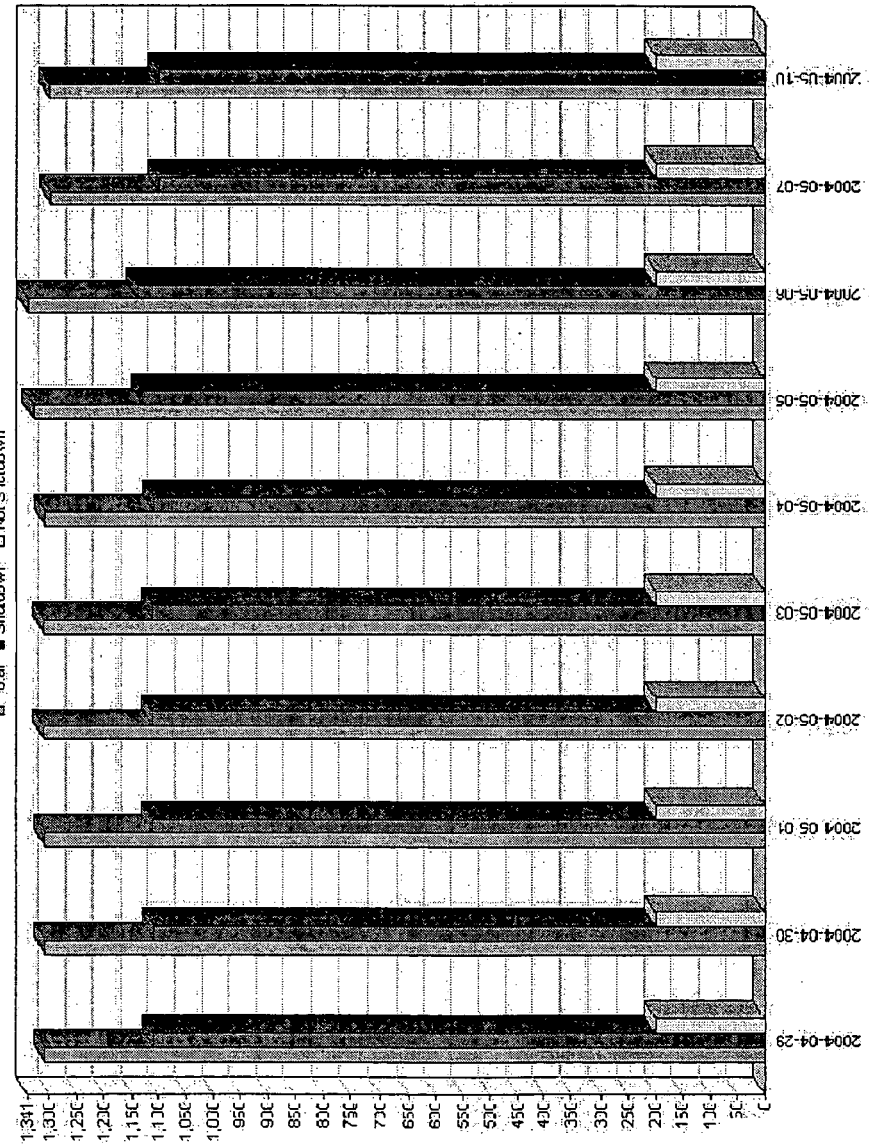
Figure 11D:
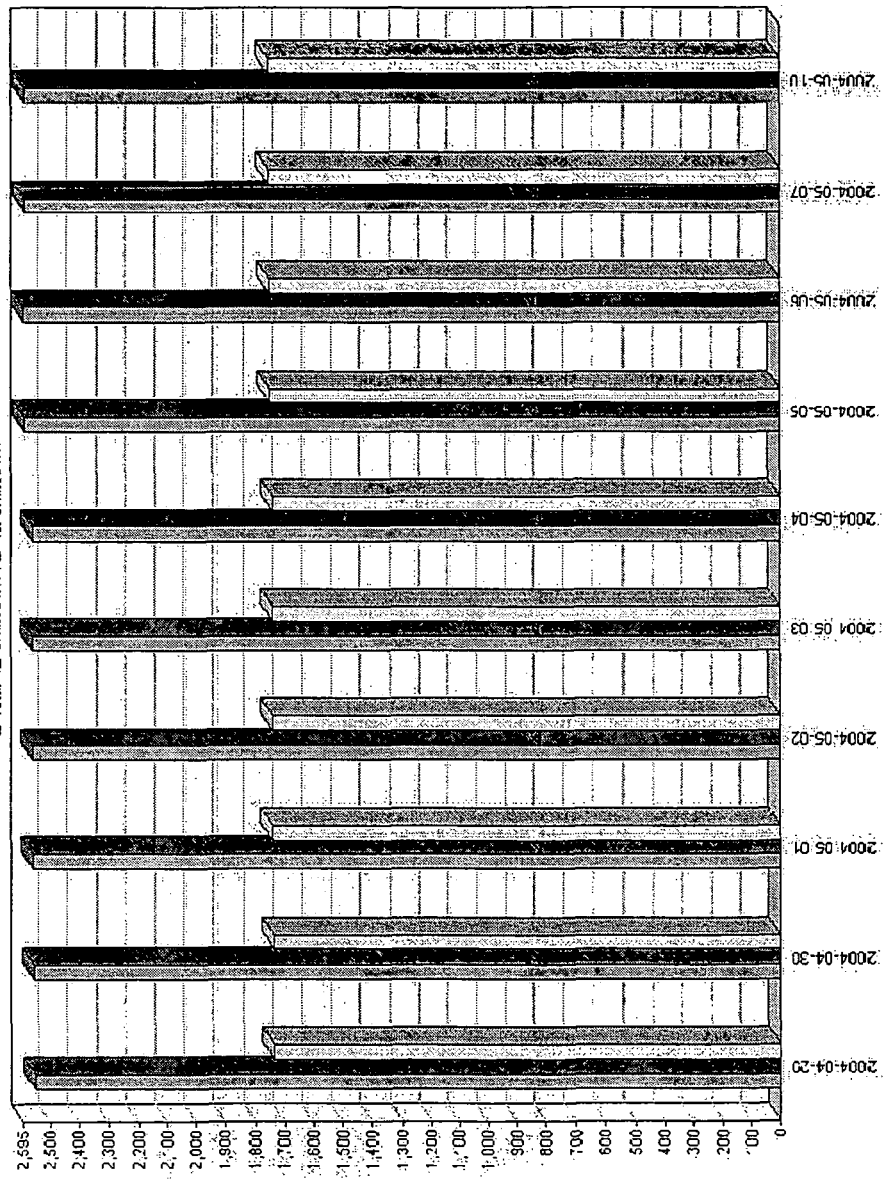
Figure 11E:
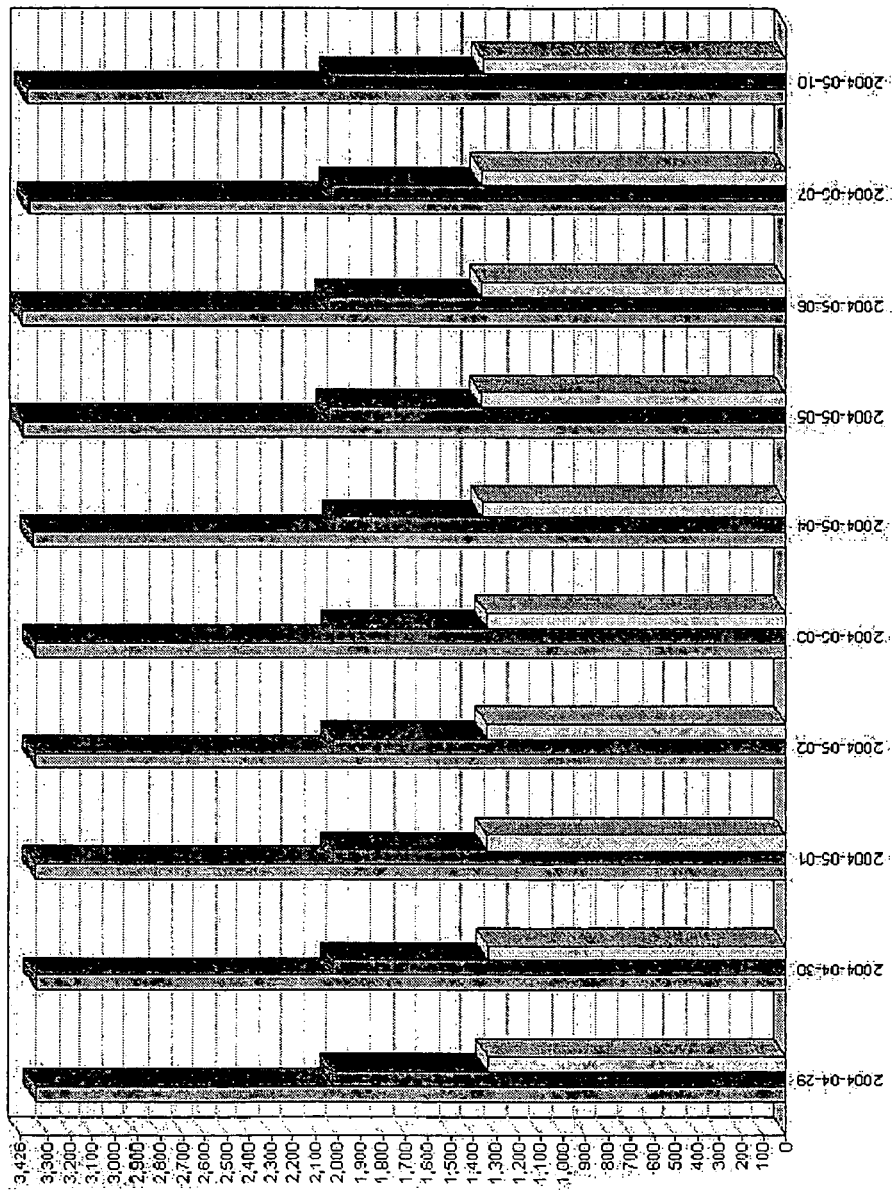
Figure 11F:
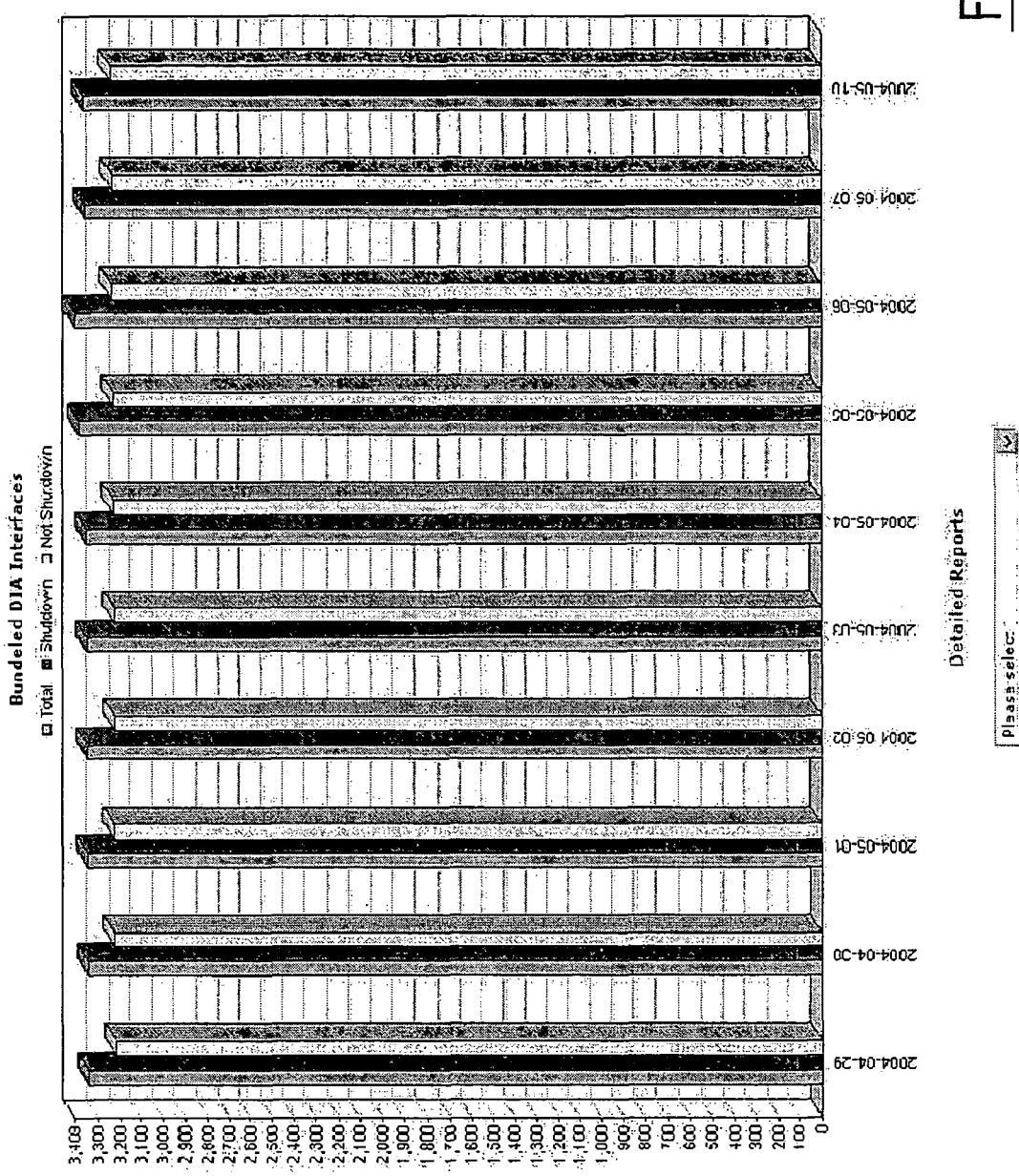
Figure 11G:
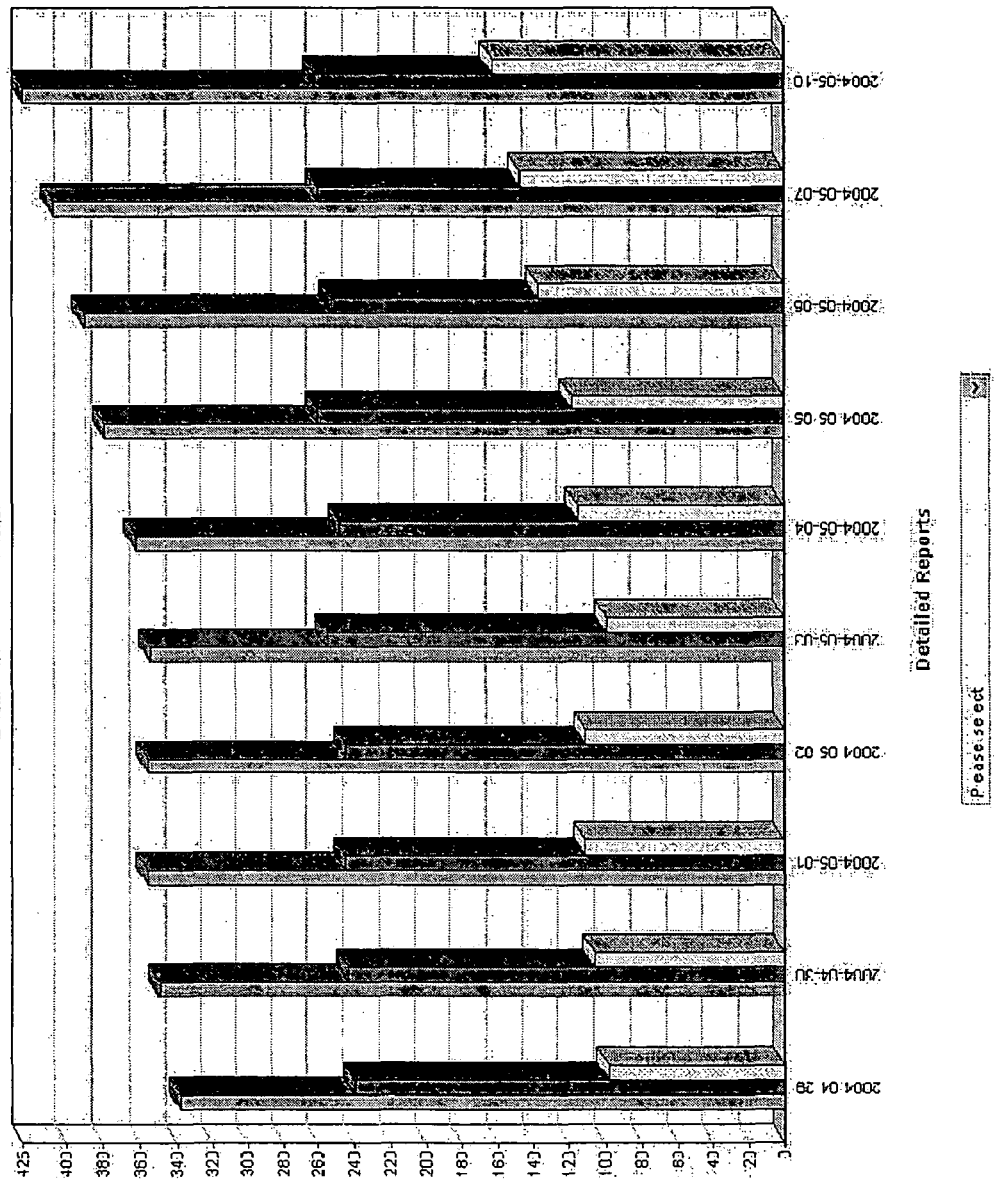

FIG. 11A to FIG. 11G are graphs illustrating interface statistics for the network 210. FIG. 11A illustrates host statistics, such as failures, changes, and reboots, for the network 210 over a 10-day period. FIG. 11B shows configuration statistics, such as lines added, lines removed, and lines modified, for the network 210 over a 10-day period. FIG. 11C, FIG. 11D, and FIG. 11E illustrate error statistics for IP addresses, circuit identification, and bandwidth statements, respectively, for the network 210 over a 10-day period. FIG. 11F shows statistics for bundled Dedicated Internet Access (DIA) interfaces for the network 210 over a 10-day period. FIG. 11G illustrates statistics for a service provider for the network 210 over a 10-day period.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method of monitoring a plurality of network elements in a communications network, the method comprising:
   querying the plurality of network elements, in parallel, for respective reboot and/or reconfiguration event data, wherein the respective reboot and/or reconfiguration event data indicates a reboot and/or reconfiguration of a corresponding one of the plurality of network elements independent of information from a prior query;
   identifying a group of network elements including ones of the plurality of network elements based on the reboot and/or reconfiguration event data received responsive to the parallel querying, wherein the group comprises less than the plurality of network elements;
   in response to identifying the group of network elements querying the identified group of network elements, in series, and selectively requesting configuration information from ones of the identified group of network elements, wherein the configuration information is different from the reboot and/or reconfiguration event data;
   updating a network configuration database with the configuration information for the ones of the identified group of network elements;
   extracting information from the configuration information for the ones of the identified group of network elements; and
   storing the extracted information into independently searchable databases according to a category of the configuration information corresponding thereto, wherein each of the independently searchable databases comprises configuration information of a different category for the ones of the identified group of network elements.

2. The method of claim 1, wherein the independently searchable databases respectively include interface information, inventory information, routing information, IP address information, customer information, and configuration assurance information.

3. The method of claim 1, wherein querying the network elements for the respective reboot and/or reconfiguration event data comprises querying the network elements for respective reboot and/or reconfiguration timestamps, wherein the respective reboot and/or reconfiguration timestamps indicate when the reboot and/or reconfiguration of respective ones of the network elements occurred.

4. The method of claim 3, wherein the respective reboot and/or reconfiguration timestamps indicate when a most recent reboot and/or reconfiguration of the respective ones of the network elements occurred, and wherein identifying the group comprises:
   comparing the respective reboot and/or reconfiguration timestamps to respective prior timestamps for the respective ones of the network elements; and
   compiling a list including the ones of the plurality of network elements for which the respective reboot and/or reconfiguration timestamps do not match the respective prior timestamps,
   wherein the respective prior timestamps indicate a reboot and/or reconfiguration of the respective ones of the network elements that occurred prior to the most recent reboot and/or reconfiguration thereof, and wherein the prior timestamps are stored in a temporary database.

5. The method of claim 1, wherein the steps of querying, identifying, requesting, and updating are repetitively performed to generate an archival network configuration database including a configuration history.

6. The method of claim 5, further comprising:
   querying the archival network configuration database; and
   generating a configuration comparison report between specified times for a network element responsive to a user request.

7. The method of claim 1, further comprising displaying all customers connected to a particular network element responsive to a user request.

8. The method of claim 1, further comprising:
   querying the network for added and/or removed network elements; and
   updating the network configuration database with information for the added and/or removed elements.

9. A data processing system, comprising:
   a network configuration database embodied in a non-transitory computer readable medium; and
   a change monitor embodied in a non-transitory computer readable medium configured to query a plurality of network elements in a communication network in parallel for respective reboot and/or reconfiguration event data indicating a reboot and/or reconfiguration of a corresponding one of the plurality of network elements, identify a group of network elements including ones of the plurality of network elements based on the reboot and/or reconfiguration event data received responsive to the parallel queries, wherein the group comprises less than the plurality of network elements, query the identified group of network elements in series and selectively request configuration information from ones of the identified group of network elements in response to identification the group of network elements, wherein the configuration information is different from the reboot and/or reconfiguration event data, update the network configuration database with the configuration information for the ones of the identified group of network elements, extract information from the configuration information for the ones of the identified group of network elements, and store the extracted information into independently searchable databases according to a category of the configuration information corresponding thereto, wherein each of the independently searchable database comprises configuration information of a different category for the ones of the identified group of network elements.

10. The system of claim 9, wherein the independently searchable databases respectively include interface information, inventory information, routing information, IP address information, customer information, and configuration assurance information.

11. The system of claim 9, wherein the change monitor is configured to query the network elements for respective reboot and/or reconfiguration timestamps, wherein the respective reboot and/or reconfiguration timestamps indicate when the reboot and/or reconfiguration of respective ones of the network elements occurred.

12. The system of claim 11, wherein the respective reboot and/or reconfiguration timestamps indicate when a most recent reboot and/or reconfiguration of the respective ones of the network elements occurred, wherein the change monitor is configured to identify the group by comparing the respective reboot and/or reconfiguration timestamps to respective prior timestamps for the respective ones of the network elements and compiling a list including the ones of the plurality of network elements for which the respective reboot and/or reconfiguration timestamps do not match the respective prior timestamps, wherein the respective prior timestamps indicate a reboot and/or reconfiguration of the respective ones of the network elements that occurred prior to the most recent reboot and/or reconfiguration thereof, and wherein the prior timestamps are stored in a temporary database.

13. The system of claim 9, wherein the change monitor is configured to repetitively perform the steps of querying, identifying, requesting, and updating to generate an archival network configuration database including a configuration history.

14. The system of claim 13, wherein the change monitor is further configured to query the archival network configuration database and generate a configuration comparison report between specified times for a network element responsive to a user request.

15. The system of claim 9, further comprising a user interface configured to display all customers connected to a particular network element responsive to a user request.

16. The system of claim 9, wherein the change monitor is further configured to query the network for added and/or removed network elements and to update the network configuration database with information for the added and/or removed elements.

17. An article of manufacture for monitoring a plurality of network elements in a communication network, the article of manufacture comprising a computer code embodied in a non-transitory computer readable medium, the computer code comprising:
  code configured to query a plurality of network elements in a communication network in parallel for respective reboot and/or reconfiguration event data indicating a reboot and/or reconfiguration of a corresponding one of the plurality of network elements,
  code configured to identify a group of network elements including ones of the plurality of network elements based on the reboot and/or reconfiguration event data received responsive to the parallel queries, wherein the group comprises less than the plurality of network elements,
  code configured to query the identified group of network elements in series and selectively request configuration information from ones of the identified group of network elements in response to identifying of the group of network elements, wherein the configuration information is different from the reboot and/or reconfiguration event data,
  code configured to update a network configuration database with the configuration information for the ones of the identified group of network elements; and
  code configured to extract information from the configuration information for the ones of the identified group of network elements, and store the extracted information into independently searchable databases according to a category of the configuration information corresponding thereto, wherein each of the independently searchable database comprises configuration information of a different category for the ones of the identified group of network elements.

18. The article of manufacture of claim 17, wherein the independently searchable databases respectively include interface information, inventory information, routing information, IP address information, customer information, and configuration assurance information.

19. The article of manufacture of claim 17, wherein code configured to query the network elements for respective reboot and/or reconfiguration event data comprises code configured to query the network elements for respective reboot and/or reconfiguration timestamps, wherein the respective reboot and/or reconfiguration timestamps indicate when the reboot and/or reconfiguration of respective ones of the network elements occurred.

20. The article of manufacture of claim 19, wherein the respective reboot and/or reconfiguration timestamps indicate when a most recent reboot and/or reconfiguration of the respective ones of the network elements occurred, wherein code configured to identify the group comprises code configured to compare the respective reboot and/or reconfiguration timestamps to respective prior timestamps for the respective ones of the network elements and compile a list including the ones of the plurality of network elements for which the respective reboot and/or reconfiguration timestamps do not match the respective prior timestamps, wherein the respective prior timestamps indicate a reboot and/or reconfiguration of the respective ones of the network elements that occurred prior to the most recent reboot and/or reconfiguration thereof, and wherein the prior timestamps are stored in a temporary database.

21. The article of manufacture of claim 17, wherein the code configured to query, identify, request, and update are repetitively executed to generate an archival network configuration database including a configuration history.

22. The article of manufacture of claim 21, further comprising code configured to query the archival network configuration database and generate a configuration comparison report between specified times for a network element responsive to a user request.

23. The article of manufacture of claim 17, further comprising code configured to display all customers connected to a particular network element responsive to a user request.

24. The article of manufacture of claim 17, further comprising:
  code configured to query the network for added and/or removed network elements; and
  code configured to update the network configuration database with information for the added and or removed elements.

* * * * *